(12) United States Patent
Doh

(10) Patent No.: US 11,121,991 B2
(45) Date of Patent: Sep. 14, 2021

(54) USER TERMINAL AND SEARCH SERVER PROVIDING A SEARCH SERVICE USING EMOTICONS AND OPERATING METHOD THEREOF

(71) Applicant: Mycelebs Co., Ltd., Seoul (KR)

(72) Inventor: Jun Woong Doh, Seoul (KR)

(73) Assignee: Mycelebs Co., Ltd., Seoul (KR)

( * ) Notice: Subject to any disclaimer, the term of this patent is extended or adjusted under 35 U.S.C. 154(b) by 83 days.

(21) Appl. No.: 15/953,321

(22) Filed: Apr. 13, 2018

(65) Prior Publication Data

US 2019/0007352 A1    Jan. 3, 2019

(30) Foreign Application Priority Data

Jul. 3, 2017  (KR) .................. 10-2017-0084209
Nov. 24, 2017  (KR) .................. 10-2017-0158648

(51) Int. Cl.
  *G06F 15/16*   (2006.01)
  *H04L 12/58*   (2006.01)

(52) U.S. Cl.
  CPC ............ *H04L 51/046* (2013.01); *H04L 51/04* (2013.01); *H04L 51/10* (2013.01)

(58) Field of Classification Search
  CPC ........ H04L 51/04; H04L 51/046; H04L 51/10
  USPC ................. 709/207, 206, 205, 204
  See application file for complete search history.

(56) References Cited

U.S. PATENT DOCUMENTS

| | | | |
|---|---|---|---|
| 2017/0083586 A1* | 3/2017 | Huang | G06F 17/2785 |
| 2017/0308289 A1* | 10/2017 | Kim | G06F 3/04886 |
| 2017/0357521 A1* | 12/2017 | Paek | G06F 3/04817 |
| 2018/0173692 A1* | 6/2018 | Greenberg | G06F 17/276 |
| 2018/0210874 A1* | 7/2018 | Fuxman | G06F 17/2785 |
| 2018/0225013 A1* | 8/2018 | Barrett | H04L 67/36 |
| 2018/0300646 A1* | 10/2018 | Landowski | G06F 40/35 |
| 2018/0367483 A1* | 12/2018 | Rodriguez | H04L 51/046 |

FOREIGN PATENT DOCUMENTS

KR    2017-0089364    8/2017

OTHER PUBLICATIONS

How to use KakaoTalk Image Search, https://xinsound.tistory.com/1001 (Jan. 26, 2017).
KakaoTalk Image Search Longtap Search Settings and Usage, Naver Blog, https://blog.naver.com/come0511/221041995419 (Jul. 2, 2017).
Korean Office Action for Korean Patent Application No. 10-2017-0158648 dated Mar. 20, 2019.
Office Action for Korean Patent Application No. 120150581322 dated Sep. 26, 2019.

* cited by examiner

*Primary Examiner* — Karen C Tang
(74) *Attorney, Agent, or Firm* — Fay Sharpe LLP

(57) ABSTRACT

A method of proving a search service using an emoticon according to an embodiment of the present invention includes: displaying one search emoticon selected by a user from search emoticons displayed in a chat window; transmitting a search request by receiving a user input for the search emoticon displayed in a chat area; and displaying a result emoticon including a search result according to the search request of the chat area. Accordingly, a search service may be provided without exiting a chat application, and a convenient search environment providing a direct search service without executing an additional web browser for the search service may be provided to the user.

14 Claims, 22 Drawing Sheets

USER TERMINAL AND SEARCH SERVER PROVIDING A SEARCH SERVICE USING EMOTICONS AND OPERATING METHOD THEREOF

CROSS REFERENCE TO RELATED APPLICATION

The present application claims priority to Korean Patent Application Nos. 10-2017-0084209, filed Jul. 3, 2017, and 10-2017-0158648, filed Nov. 24, 2017, the entire contents of which is incorporated herein for all purposes by this reference.

BACKGROUND OF THE INVENTION

Field of the Invention

At least some embodiments of the present description relates to a user terminal providing a search service using an emoticon, and a search server providing a search service using an emoticon, and operating method thereof.

Description of the Related Art

Recently, with the development of mobile devices such as smart phones and the development of communication methods, there is a trend that the communication method between individuals has moved to a chat service from a telephone call and a text message. Users are provided with a one-to-one or a one-to-many chat service in real time by using a chat service through the Internet, and images or emoticons are shared among them.

When a user wants to perform searching during chatting using a conventional chat service, the user has to be exit of an application providing the chat service, execute a web browser, and perform searching by inputting a keyword on a search page. Accordingly, there is a need for a method of providing a search service and sharing a search result within the application providing the chat service.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korea Patent Application No. 10-2014-0002172

SUMMARY OF THE INVENTION

An object according to at least some embodiments of the present description is to provide a search service using a search emoticon in which a search service is provided in a chat window by using a search emoticon included in a chat application rather than exiting out of a chat application when a chat service is provided by using a chat application.

In addition, another object according to at least some embodiments of the present description is to provide a search service using a search emoticon in which detailed information of a search result is displayed in a chat window by overlapping thereon when the search result provided on the chat window is selected.

In addition, still another object according to at least some embodiments of the present description is to provide a search service using a search emoticon in which a keyword reflecting a preference for a property of a search target is provided through the search emoticon, and a user may select a keyword of his or her preference so that the user may perform a user customized search when providing a search service using a search emoticon.

In addition, still another object according to at least some embodiments of the present description is to provide a search service using a search emoticon in which a personalized search emoticon is generated by enabling a user to select keywords to be included in a search emoticon from keywords provided by a search server.

According to an embodiment of the present a method of operating a user terminal providing a search service using an emoticon includes: displaying in a chat area one search emoticon selected by a user from search emoticons displayed in a chat window; transmitting a search request by receiving a user input for the search emoticon displayed in the chat area; and displaying a result emoticon including a search result according to the search request in the chat area.

In addition, the method may further include: when the user selects the search result included in the result emoticon, displaying detailed information of the selected search result in the chat window.

In addition, the search emoticon may be provided such that the user is capable of selecting at least one keyword reflecting his or her preference for a property of a search target.

In addition, the method may further include: before the transmitting of the search emoticon to the chat window, when the user selects a search emoticon listing icon in the chat window, displaying a plurality of search emoticons in the chat window, the search emoticons providing a search service based on a property of a search target.

In addition, for the user input for the search emoticon displayed in the chat area, the user may select at least one keyword displayed in a suggestion area of the search emoticon, or the user may select random search displayed in the suggestion area and selects a search request area of the search emoticon.

In addition, the transmitting of the search request is performed, in addition to the user who has transmitted the search emoticon to the chat area, based on a user input provided by another user who participates in a chat room.

In addition, the displaying in the chat area of one search emoticon selected by the user from the search emoticons displayed in the chat window may include: selecting, by the user, the search emoticon and selecting a 'send' icon; receiving, by user terminal, a keyword list from a search server; arranging, by the user terminal, words included in the keyword list as a keyword in a suggestion area of the selected search emoticon; and displaying, by the user terminal, the search emoticon in which the keyword list is reflected in the chat area.

In addition, the displaying in the chat area of one search emoticon selected by the user among the search emoticons displayed in the chat window may include: receiving an input of selecting one of the search emoticons displayed in the chat window; receiving and displaying keywords related to the selected search emoticon in the chat window; receiving an input of selecting at least one of the keywords displayed in the chat window; and displaying the selected search emoticon including the selected keyword in the chat area when an input of transmitting the selected search emoticon is received.

In addition, the method may further include: when the input of selecting one of the search emoticons is received, displaying a preview of the selected search emoticon in the chat window; and when the input of selecting at least one of the keyword is received, displaying the selected keyword in the preview.

In addition, the search emoticon may include a storage area or a share area, when an input of selecting the storage area or the share area is received, the search emoticon and the keyword which are displayed in the chat area are stored in a search server or are shared through the search server.

According to an embodiment of the present description, a user terminal providing a search service using an emoticon includes: a display unit displaying a chat window including a search emoticon; an input unit for receiving an input of selecting an object in the chat window; a control unit displaying in a chat area one search emoticon selected by the user from the search emoticons displayed in the chat window by using the display unit, transmitting a search request by receiving a user input for the search emoticon displayed in the chat area by using the input unit, and displaying a result emoticon including a search result according to the search request in the chat area by using the display unit; and a communication unit receiving keywords related to the selected search emoticon, and transmitting a search emoticon including selected keywords.

According to an embodiment of the present description, a method of operating a search server providing a search service using an emoticon includes: transmitting keywords related to a search emoticon selected from search emoticons displayed in a chat window; receiving a search request including a keyword selected from the keywords included in the search emoticon displayed in a chat area; and transmitting a search result obtained by searching for a search target of the search emoticon displayed in the chat area by using the selected keyword.

In addition, the transmitting of the keywords related to the search emoticon selected from the search emoticons displayed in the chat window may include: arranging words included in a property of a search target of the search emoticon selected from the search emoticons displayed in the chat window in an order of high interest by people; and selecting a number of keywords which is larger than a number of keywords included in a suggestion area of the search emoticon in an order of high interest by people from the arranged words, and transmitting the selected keywords.

In addition, the method may further include: receiving a request for storing the search emoticon displayed in the chat area; and storing the search emoticon displayed in the chat area and the keywords included in the search emoticon displayed in the chat area in association with a user account.

According to an embodiment of the present description, a search server providing a search service using an emoticon includes: a communication unit performing communication with at least one user terminal using a search service using an emoticon; a keyword list providing unit selecting and transmitting keywords related to a search emoticon selected from search emoticons displayed in a chat window; and a search performing unit providing a search result obtained by searching for a search target of the search emoticon displayed in the chat area by using a keyword selected from the keywords included in the search emoticon displayed in the chat area.

In addition, the search server may further include: an additional function managing unit storing the search emoticon or transmitting the search emoticon to another user or another chat room when a request for storing or sharing the search emoticon is received from the user terminal.

According to an embodiment of the present description, a transmission method, wherein the method transmits a program code readable by an electronic device, includes: obtaining a program code performing at least a part of a method of operating a user terminal providing a search service using an emoticon according to an embodiment of the present description, or an installation program code for installing the program code; and transmitting the program code or the installation program code.

According to an embodiment of the present description, a transmission device, wherein the device transmits a program code readable by an electronic device, includes:

a control unit obtaining a program code performing at least a part of a method of operating a user terminal providing a search service using an emoticon according to an embodiment of the present description, or an installation program code for installing the program code; and a communication unit transmitting the program code or the installation program code.

According to an embodiment of the present description, a search service can be provided in a chat window by using a search emoticon included in a chat application provided by a chat service rather than exiting of a chat application, thus a convenient search environment providing a direct search service rather than executing an additional web browser for the same can be provide to a user.

In addition, when a user selects a search result, detailed information of the search result selected in the chat window can be displayed in the chat window by overlapping thereon without exiting the chat application and executing a web browser for displaying information of the search result, thus the user can be conveniently provided with the search result.

In addition, a search emoticon provides to a user a keyword reflecting a preference of a property of a search target, and the user transmits a search request by selecting a keyword matching to his or her preference, thus the user can be provided with a search result matching to his or her preference.

In addition, a user can use a search emoticon by generating a user customized search emoticon by selecting a keyword reflecting his or her preference from a plurality of keywords provided from a server.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
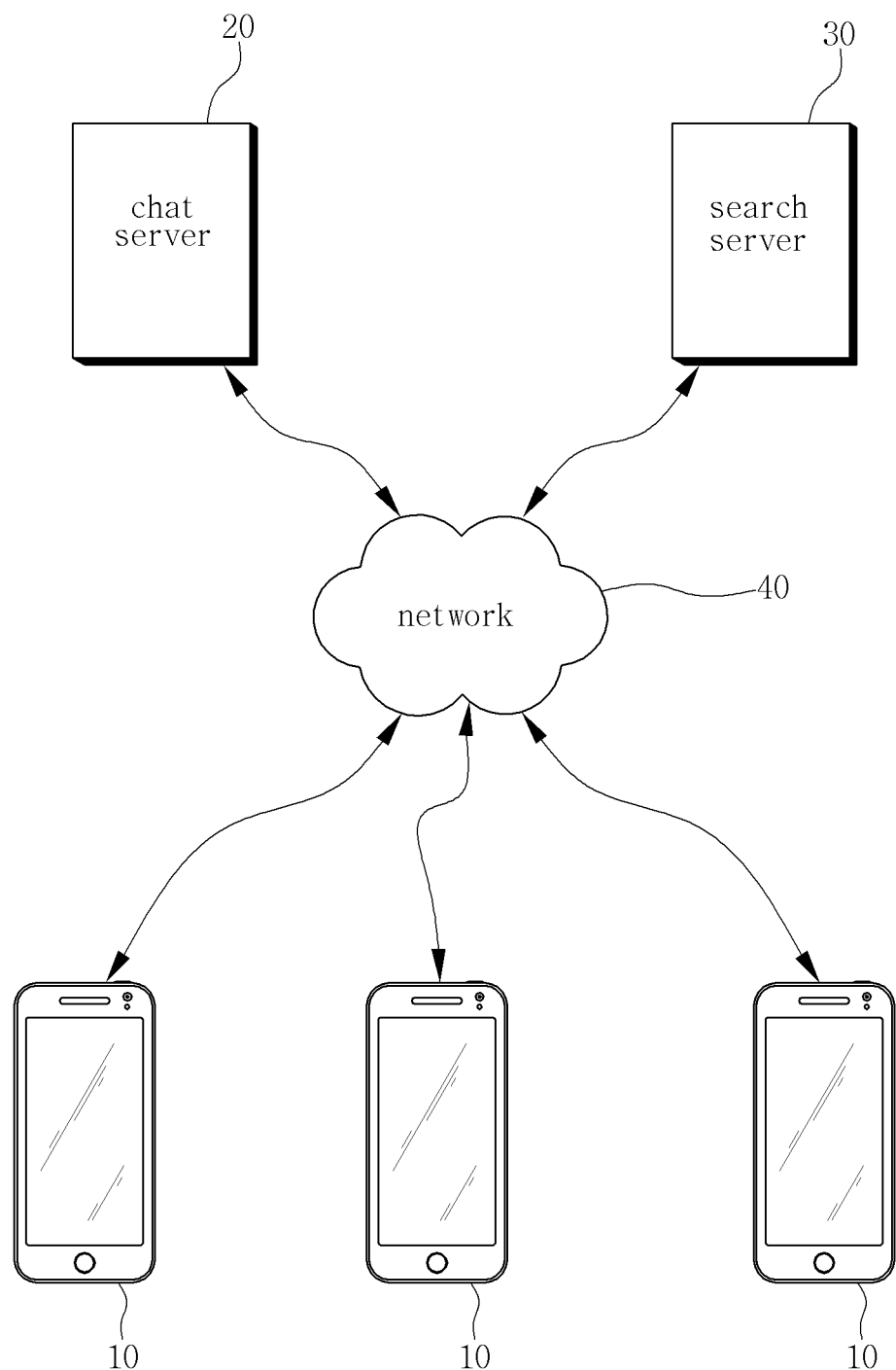
FIG. 1 is a view showing a block configuration of a system providing a search service using an emoticon according to an embodiment of the present description.

The above and other objects, features and other advantages of the present description will be more clearly understood from the following detailed description when taken in conjunction with the accompanying drawings. It should be noted that when denoting parts in the drawing by reference numerals, the same reference numerals will refer to the same or like parts throughout the drawings. It will also be understood that, although the terms "one side", "the other side", "first", "second", etc. may be used herein to describe various elements, these elements should not be limited by these terms. Hereinafter, in the following description of the present description, detailed descriptions of known functions and components incorporated herein will be omitted when it may make the subject matter of the present invention unclear.

Hereinafter, embodiments of the present description will be described with reference to the accompanying drawings.

Figure 2:
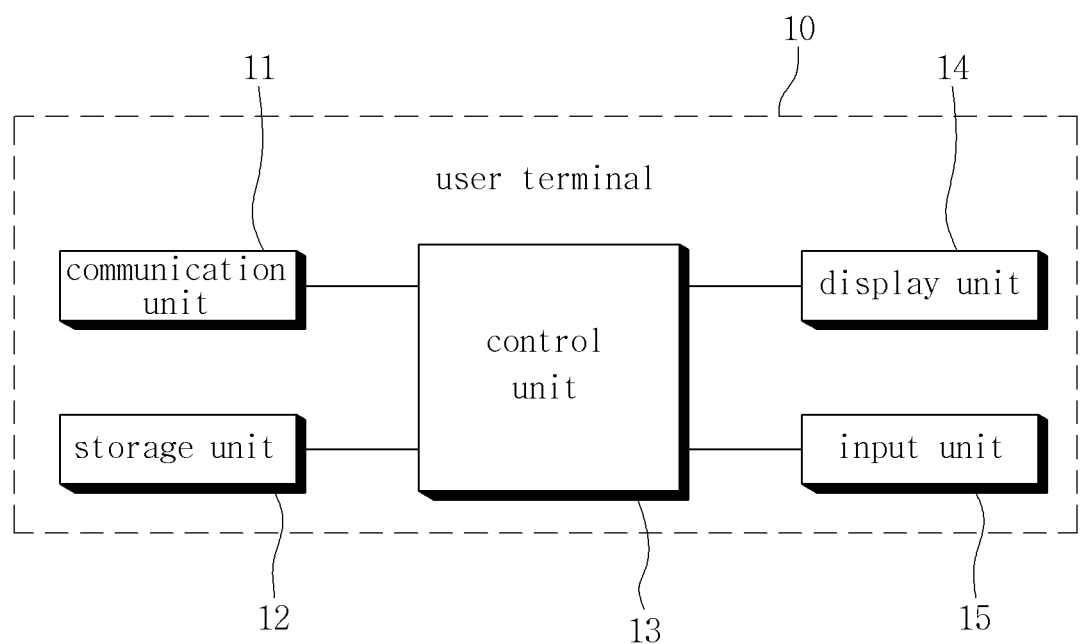
FIG. 2 is a view showing a block configuration of a user terminal according to an embodiment of the present description.
Figure 3:
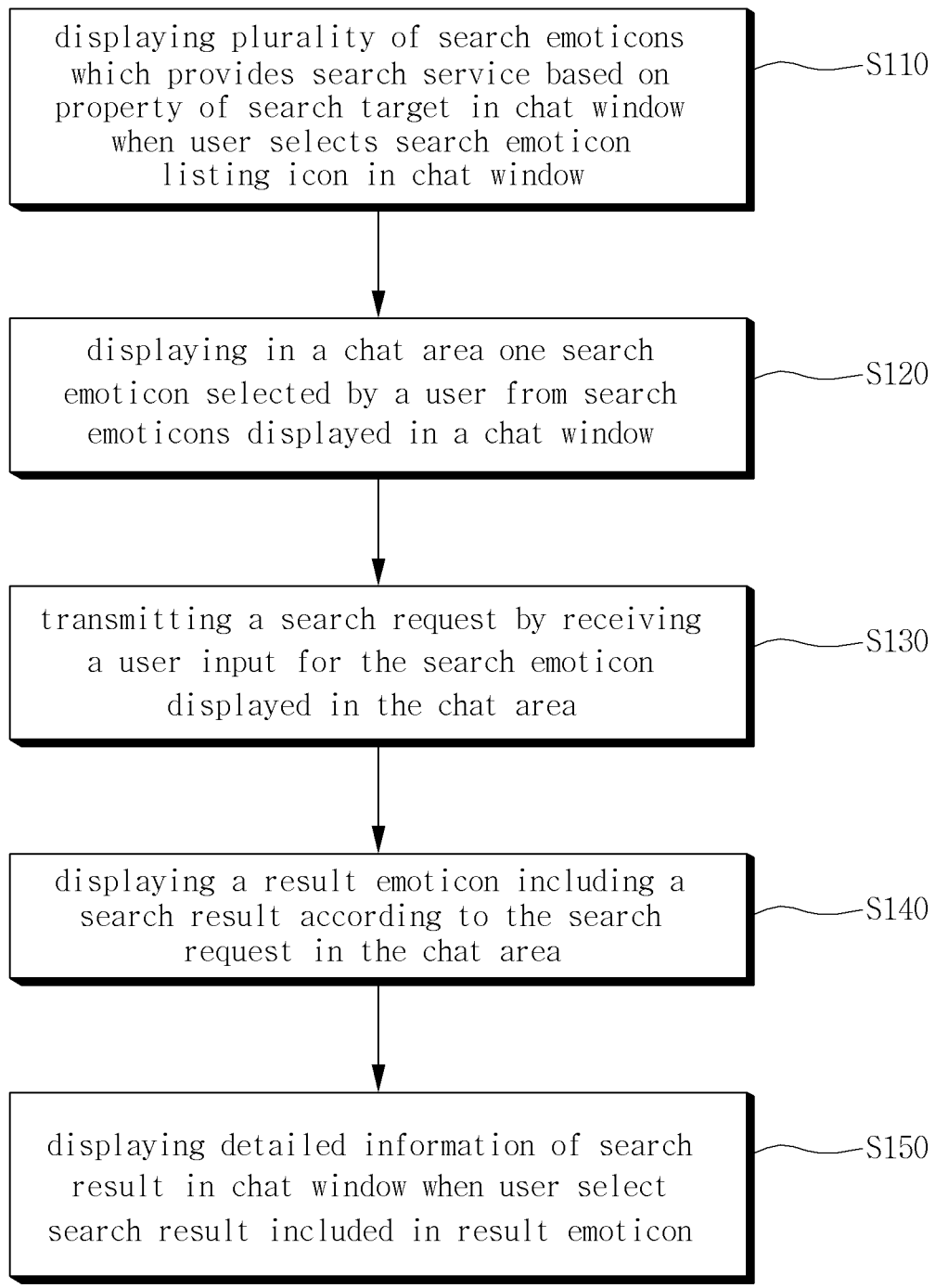
FIG. 3 is a view showing a flowchart of a method of operating the user terminal according to an embodiment of the present description.

FIG. 1 is a view showing a block configuration of a system providing a search service using an emoticon according to an embodiment of the present description, FIG. 2 is a view showing a block configuration of a user terminal according to an embodiment of the present description, and FIG. 3 is a view showing a flowchart of a method of operating the user terminal according to an embodiment of the present description;

As shown in FIG. 1, a system for providing a search service using an emoticon according to an embodiment of the present description includes a user terminal 10 in which a chat application including a search emoticon list 130 is executed, a chat server 20 providing a chat service to the user through the chat application, and a search server 30 receiving a search request through a search emoticon 200 included in the search emoticon list 130 and providing a search result to the user through a result emoticon 300. The chat server 20 and the search server 30 may be operated in one server, or may be operated in separate servers. As shown in FIG. 1, the user terminal 10 is connected to the chat server 20, the search server 30, and another user terminal 10 by using a wired/wireless network 40.

The chat server 20 may provide a chat application, perform a member management of users of the chat application, manage a chat environment, and perform a chat connection between the users. When the chat server 20 receives a search request using a search emoticon 200 from a user terminal 10, the chat server 20 may transmit the search request to the search server 30. When the chat server 20 receives a search result 311 from the search server 30, the chat server 20 may transmit the search result 311 to the user terminal 10. Alternatively, the user terminal 10 may directly transmit a search request to and receive a search result 311 from the search server 30 through an API.

As shown in FIG. 2, the user terminal 10 according to an embodiment of the present description may include: a display unit 14 displaying a chat window 100 including a search emoticon 200; an input unit 15 for receiving a selection of an object in the chat window 100; a control unit 13 displaying keywords 211 related to a search emoticon 200 selected in the chat window 100 when the input unit 15 receives an input of selecting the search emoticon 200, and generating a signal of displaying the selected search emoticon 200 including the selected keywords 211 in a chat area 110 when the input unit 15 receives an input of selecting of at least one of the keywords 211 and an input of transmitting the selected search emoticon 200; and a communication unit 11 receiving the keywords 211 related to the selected search emoticon 200, and transmitting and receiving the search emoticon 200 including the selected keywords 211.

Figure 7A:
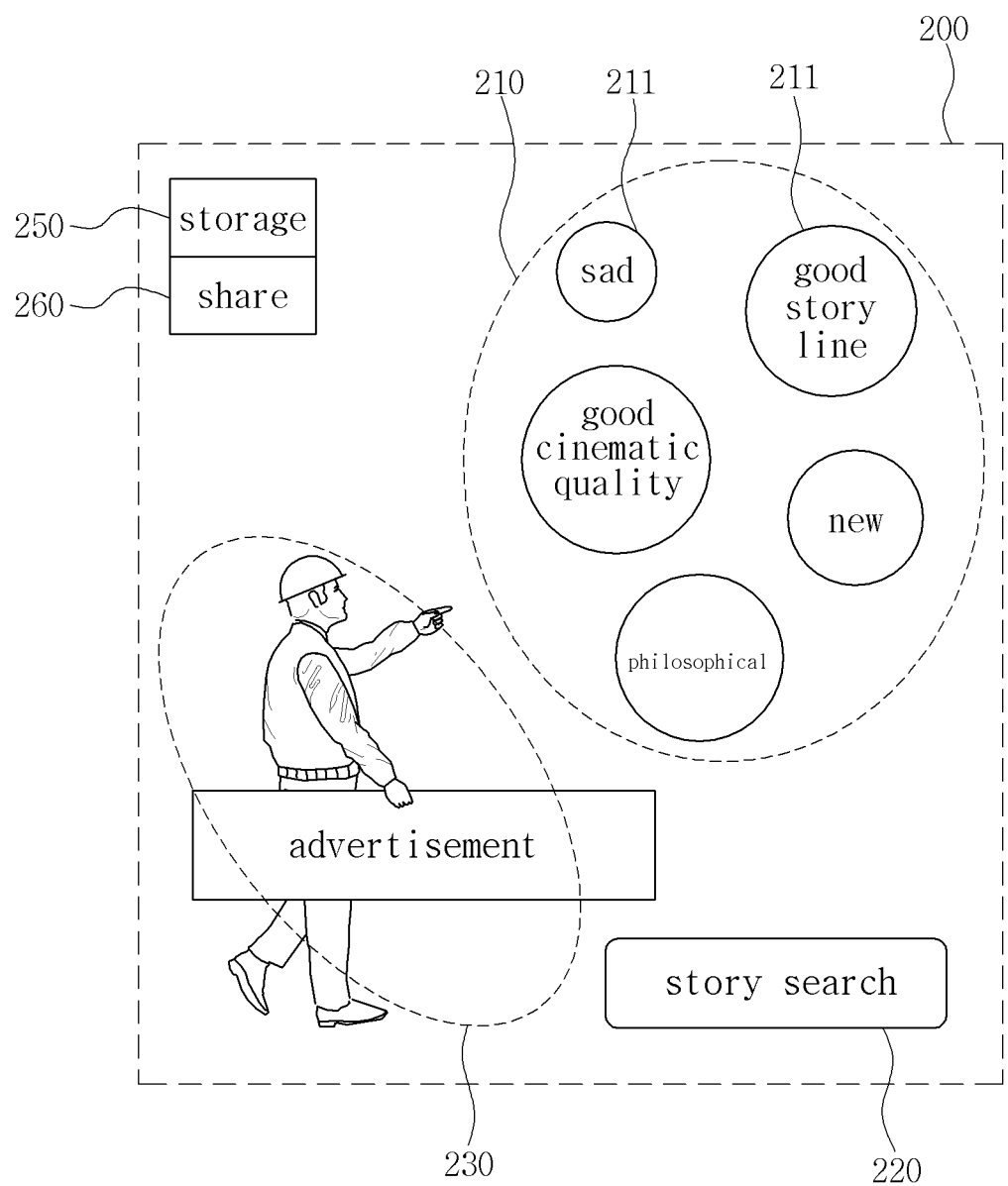
FIGS. 7A to 7C are view showing an embodiment of a search emoticon according to an embodiment of the present description.
Figure 7B:
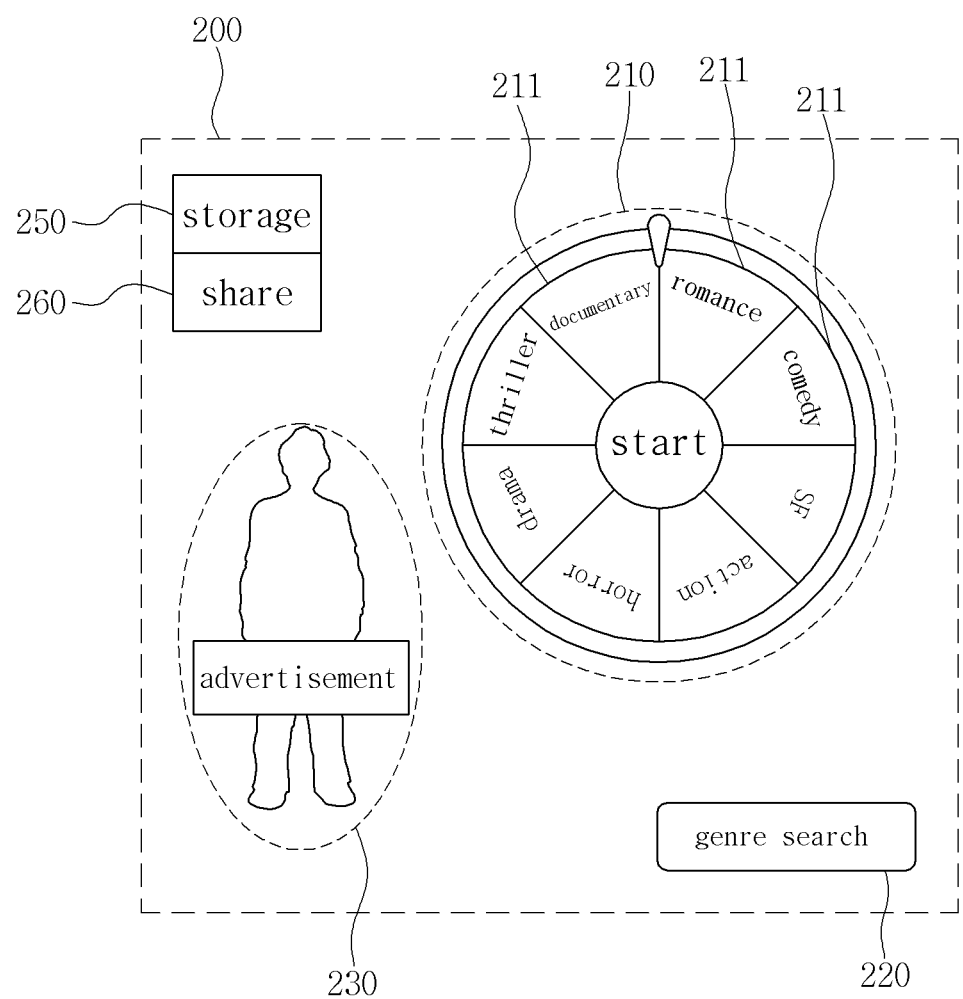
Figure 7C:
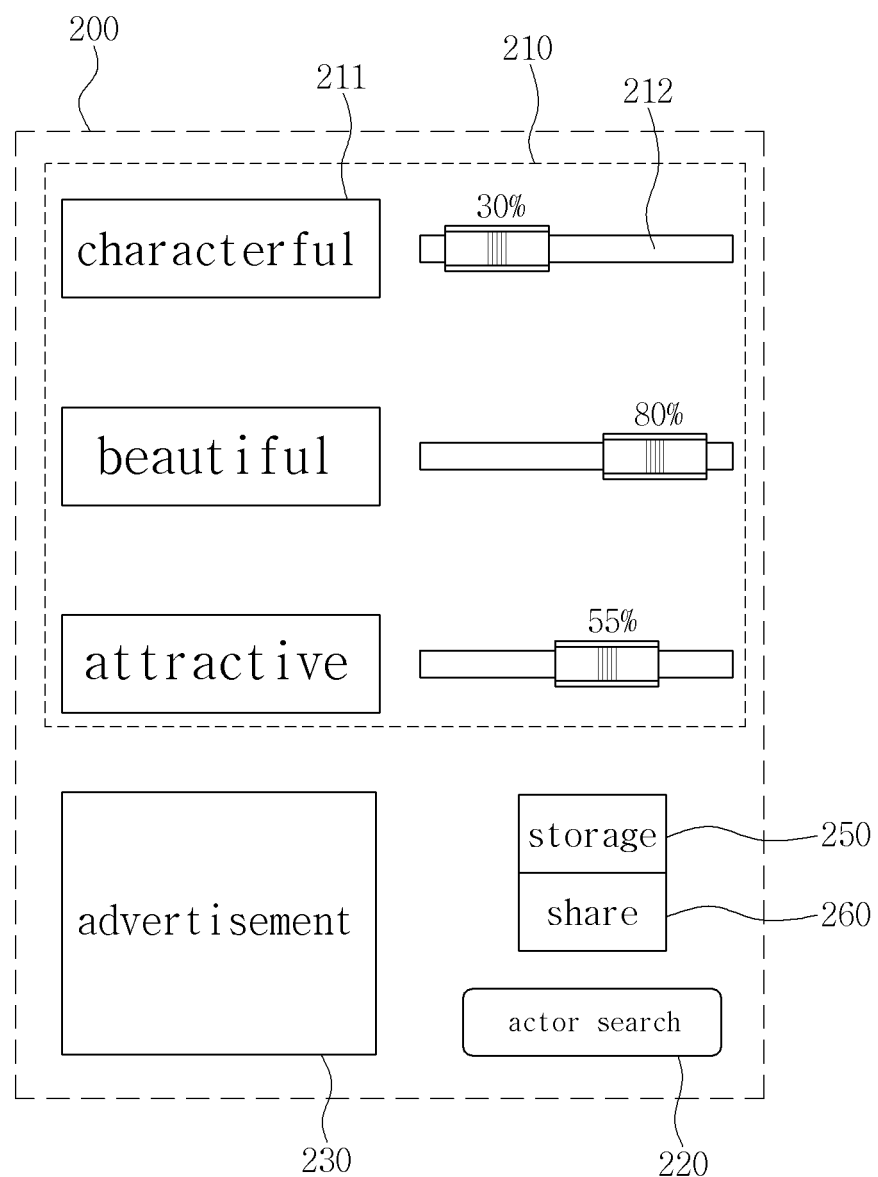

The chat application installed and executed in the user terminal 10 may integrate an 'infoticon module' for performing a method of providing a search service using an emoticon. 'Infoticon' is shown in FIGS. 7A to 7C below, and refers to an emoticon for providing a search service and information such as a search emoticon 200 described in FIGS. 4E and 4F and a result emoticon 300. The 'infoticon module' includes a program code for executing the method of providing a search service using an emoticon in the chat application. The 'infoticon module' may be included in various chat applications, and may be installed by the user of the chat application through an in-app purchase.

The user terminal 10 may be a portable information communication device such as smartphone, tablet PC, notebook, etc. or a non-portable information processing device such as a PC, etc.

The communication unit 11 transmits/receive data to/from at least one other user terminal 10, the search server 30 that provides a keyword 211 or search result 311 according to the method of providing a search service using an emoticon, and the chat server 20 that supports transmitting/receiving chat contents.

The storage unit 12 stores data required for operating the user terminal 10. The storage unit 12 may store a program code performing a search service using an emoticon.

The control unit 13 may execute a program code providing a search service using an emoticon. The control unit 13 may control the display unit 14 to display a keyword 211 received through the communication unit 11, a search result 311, etc. in the chat window 100. The control unit 13 may display one search emoticons 200 selected by the user from search emoticons 200 displayed in the chat window 100 in the chat area 110 through the display unit 14, performs a search request by receiving a user input for the search emoticon 200 displayed in the chat area 110 through the input unit 15, and display a result emoticon 300 including a search result 311 according to the search request in the chat area 110 through the display unit 14.

The display unit 14 visually provides the chat window 100 and various objects displayed in the chat window 100 according to a control of the control unit 13. The display unit 14 may be formed with a liquid crystal display (LCD), organic light emitting diodes (OLED), active matrix organic light emitting diodes (AMOLED), etc.

The input unit 15 receives a user input and transfers the same to the control unit 13. The input unit 15 may be configured with a touch detecting sensor of a capacitance type, a resistive type, an infrared type, etc., may be configured with a pressure sensor, or may be configured with a keyboard, a mouse, etc. which are input devices of a PC.

As shown in FIG. 3, a method of providing a search service using an emoticon according to an embodiment of the present description may include: step S110 of displaying a plurality of search emoticons 200 in the chat window 100 which provides a search service based on a property of a search target when a user selects a search emoticon listing icon 122 in the chat window 100; step S120 of displaying in the chat area 110 one search emoticon 200 selected by the user from the search emoticons 200 displayed in the chat window 100; step S130 of transmitting a search request by receiving a user input for the search emoticon 200 displayed in the chat area 110; step S140 of displaying a result emoticon 300 including a search result 311 according to the search request in the chat area 110; and step S150 of displaying detailed information of a selected result 311 in the chat window 100 when the user selects the search result 311 included in the result emoticon 300.

A method of providing a search service using an emoticon according to an embodiment of the present description provides a convenient search environment to the user since the user is provided with the search service by using an emoticon within the chat application rather than requiring the user to exit the chat application and execute another application such as web browser.

A chat service is a service providing real-time one-to-one, one-to-many, or many-to-many conversation to a user of a PC, a tablet PC, a smartphone, a PDA, etc. through a user terminal 10.

The chat service may be provided based on a chat application installed and executed in the user terminal 10. Alternatively, without installing the chat application in the user terminal 10, the chat service may be provided when the user terminal 10 accesses the chat server 20 through a web browser.

Figure 4A:
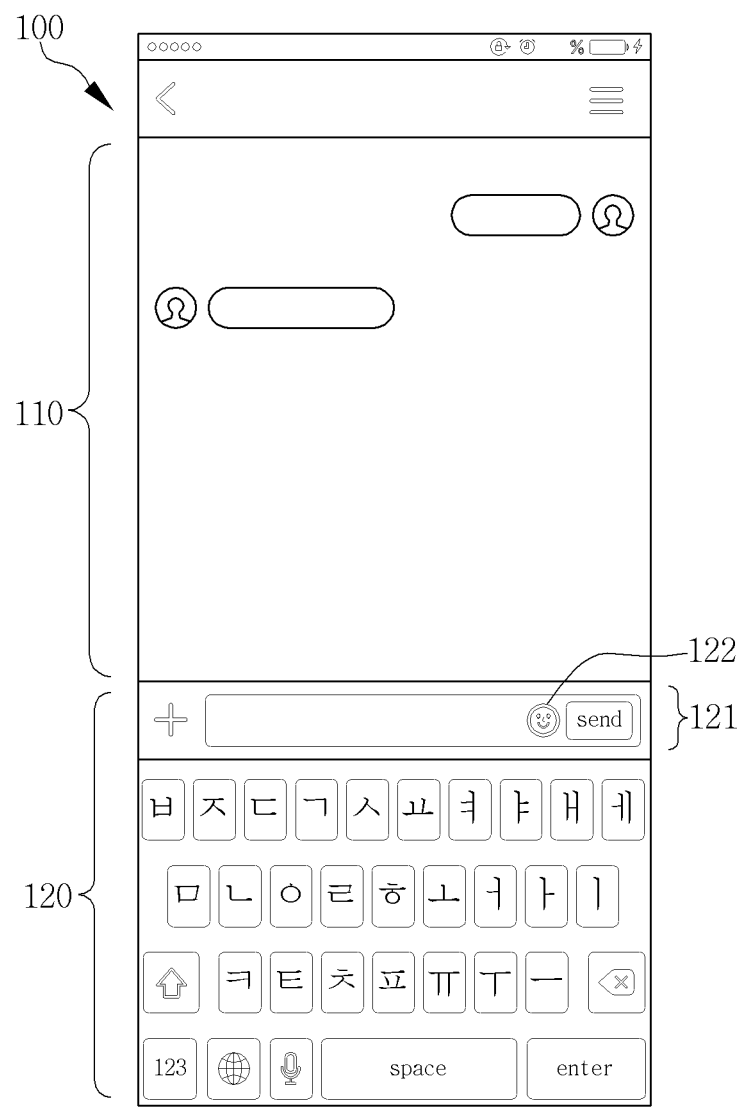
FIGS. 4A to 4G are views showing each step of the method of operating the user terminal according to an embodiment of the present description.

As shown in FIG. 4A, the chat window 100 in which a chat service is provided may include at least one chat area 110 and input area 120. The chat area 110 is an area in which messages of the user and the other side are displayed, and is an area that is commonly displayed in the user terminal 10 of all users who participate in the chat room. The input area 120 is an area through which the user inputs a message by using a keyboard or soft key, and is an area that is not identically displayed to other users who participate in the chat room. Other users may be provided with a similar input area, but it may not be displayed to other users as to what contents the user has entered in the input area 120. The input area 120 may include an input bar 121 displaying a message being input by the user, and a search emoticon listing icon 122 for inputting an emoticon.

Figure 4B:
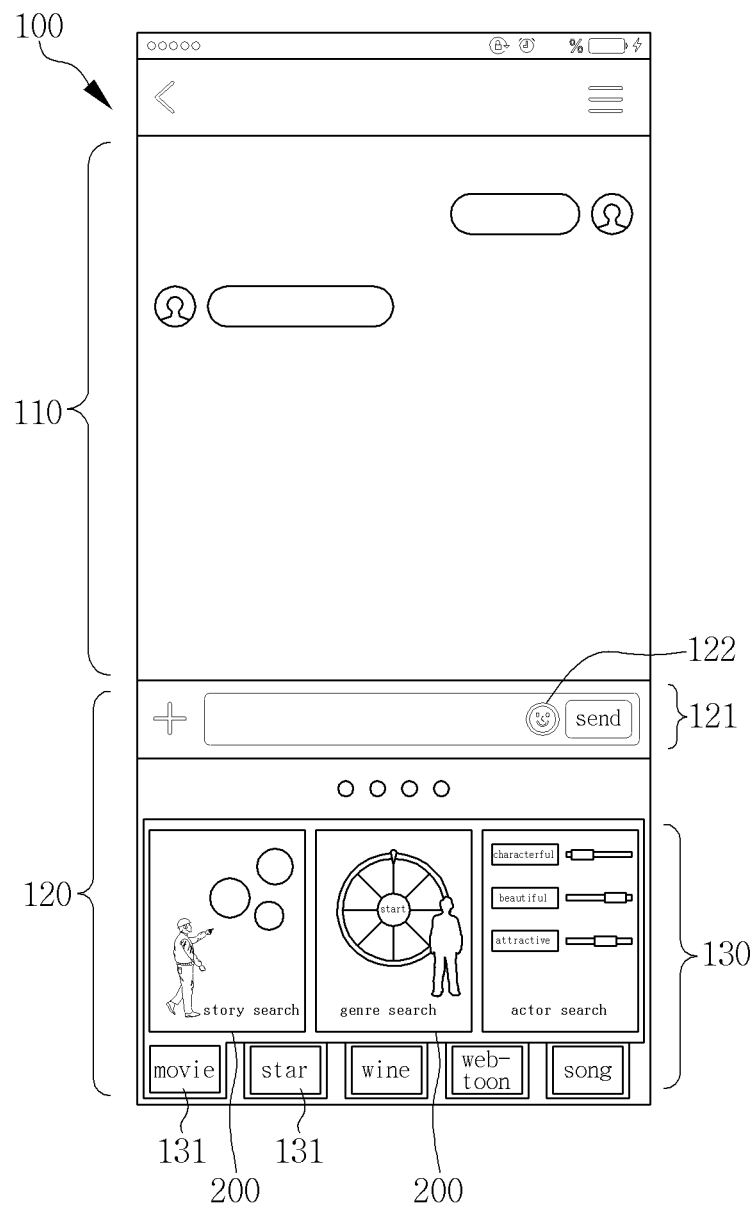

As shown in FIG. 4B, when the user selects a search emoticon listing icon 122 in the chat window 100, in step S110, a plurality of search emoticons 200 providing a search service based on a property of a search target is displayed in the chat window 100. In detail, when the user selects the search emoticon listing icon 122 of the input area 120, a search emoticon list 130 including at least one search emoticon 200 is displayed in the input area 120. According to a modified example, the search list 130 may be always displayed in the input area 120.

The search emoticon list 130 may include at least one search emoticon 200 providing a search service based on a property of a search target. The search emoticon list 130 may include a group 131 including a search emoticon 200 related to the same search target. For example, the search emoticon list 130 may include a movie group 131 searching a movie as the search target, a star group 131 searching a star (famous people) as the search target, etc. Search emoticons 200 included in the movie group 131 may include a story search emoticon 200, a random search emoticon 200, a manufacture country search emoticon 200, etc. According to a modified example, the search emoticon list 130 may include the search emoticon 200 without dividing into the group 131.

Figure 4C:
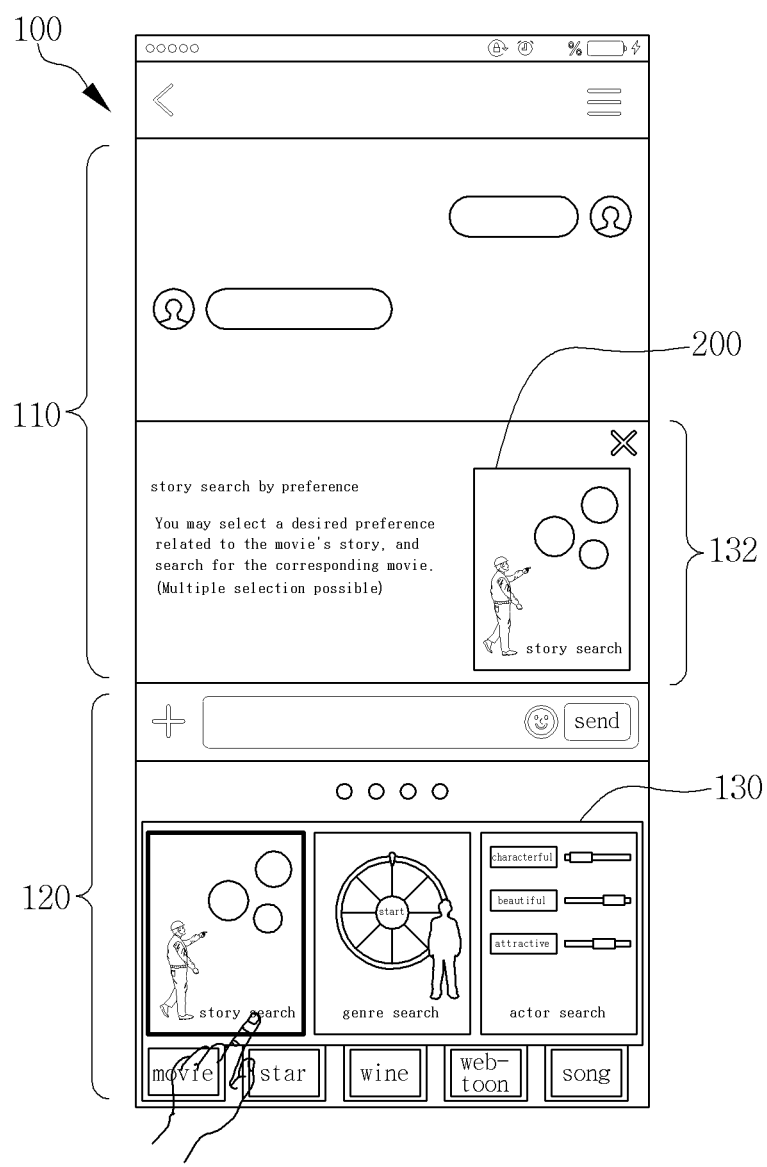

As shown in FIG. 4C, when the user selects a search emoticon 200 included in the search emoticon list 130, a sample area 132 including detailed information of the selected search emoticon 200 is displayed in the chat window 100. The sample area 132 may be displayed by overlapping in the chat area 110. For example, when the user selects a movie group 131 of the search emoticon list 130 and selects a story search emoticon 200, the sample area 132 including a description of how to use the story search emoticon 200, advertisement information, etc. may be displayed in the chat area 110 by overlapping thereon. The sample area 132 may not be displayed to other users who participate in the chat room.

Figure 4D:
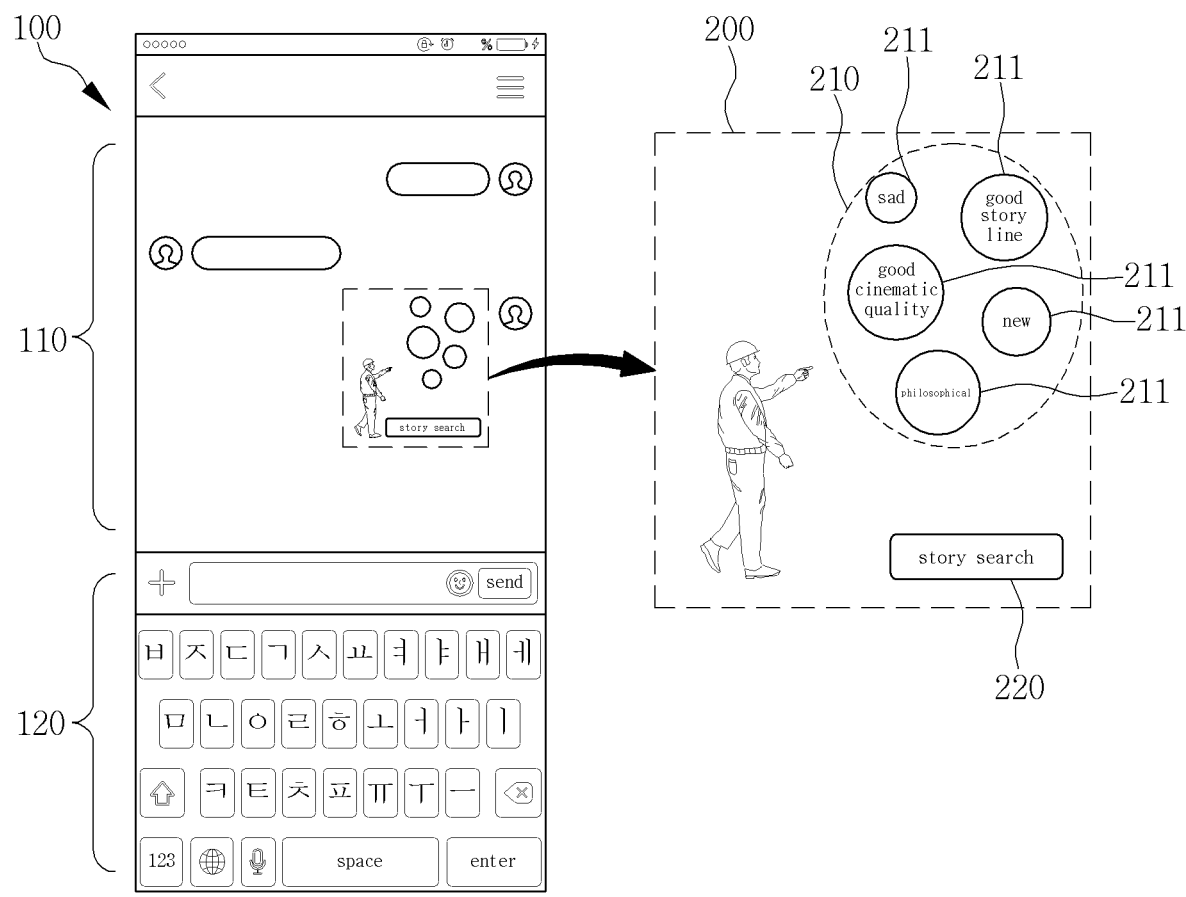

When the user selects a search emoticon 200 of the emoticon list 130 displayed in the chat window and selects a 'send' icon, as shown in FIG. 4D, in step S120, one search emoticon 200 selected by the user from the search emoticons 200 displayed in the chat window 100 is displayed in the chat area 110. The search emoticon 200 displayed in the chat area 110 is displayed in user terminals 10 of all users who participate in the chat room.

As shown in FIG. 4D, the search emoticon 200 includes a suggestion area 210 including keywords 211. The keywords 211 included in the suggestion area 210 reflect a preference of a search target. For example, for a movie, as a search target, including a story as a property, expressions such as philosophical, sophisticated, sad, new, and good story line, reflecting a preference of viewers become the keywords 211.

Keywords 211 included in the suggestion area 210 may include objective information of a property of a search target. For example, for a manufacture country of a movie property as a search target, expressions including objective information such as USA, England, Japan, etc. become the keyword 211.

Step S120 of displaying one search emoticon 200 selected by the user from the search emoticons 200 in the chat area 110 may include: a step of receiving, by the user terminal 110, an input of selecting a search emoticon 200 and selecting a 'send' icon from the user; receiving, by the user terminal 10, a keyword list from the search server 30; arranging, by the user terminal 10, words included in the keyword list as a keyword 211 of the suggestion area 210 of the selected search emoticon 200; and displaying the search emoticon 200 in which the keyword list is reflected in the chat area 110.

The search server 30 may generate a keyword list including words of high interest by people in real-time, and the keyword list may be generated by a property of a search target, and the keyword list may be provided according to a request of the user terminal 10. Generating the keyword list will be described later in detail.

By arranging words of high interest by people as keywords 211 to be included in the suggestion area 210 of the search emoticon 200, the user may transmit a search request by selecting a keyword 211 with high interest by people which is displayed in the suggestion area 210 of the search emoticon 200. Accordingly, the user searches for the search target by using the keyword 211 selected by himself or herself from keywords 211 with high interest by people, and thus the user may be provided with a search result 311 of the search target that matches his or her preference and which is currently popular.

Figure 4E:
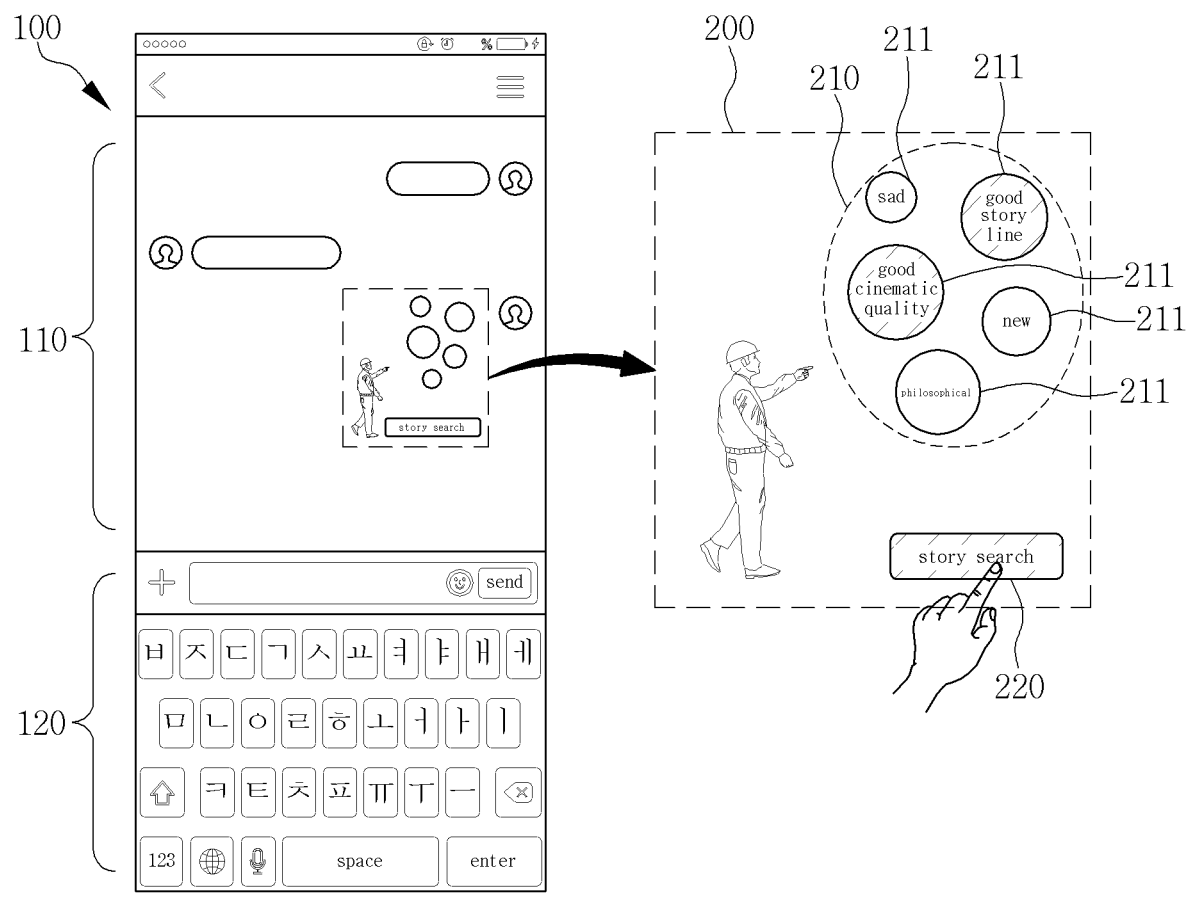

Then, as shown in FIG. 4E, step S130 of transmitting a search request by receiving a user input for the search emoticon 200 displayed in the chat area 110 is performed. The user input for the search emoticon 200 displayed in the chat area 110 may be that the user selects at least one keyword 211 displayed in the suggestion area 210 of the search emoticon 200 or the user selects a search request area 220 of the search emoticon 200 after selecting a random search displayed in the suggestion area 210. Alternatively, when the user selects the keyword 211, the search request may be transmitted immediately.

The user may select at least one keyword 211 displayed in the suggestion area 210 of the search emoticon 200 that is displayed in the chat area 110. When the user selects one of keywords 211 included in the suggestion area 210, the selected keyword 211 is activated by being changed in a mark thereof so that the user may be notified that the keyword has been selected. For example, when a keyword 211 of 'good cinematic quality' is selected, activation thereof may be indicated by a change of a color thereof, or in a size thereof.

When the user cancels the selection by re-selecting the selected keyword 211, the mark of the canceled keyword 211 is returned to an original state thereof, and the user may be notified that the selection of the keyword 211 has been canceled. For example, when the keyword of 'good cinematic quality' has been canceled by being selected again, the color or the size of the keyword 211 is returned to an original state.

Which keyword 211 has been selected by the user may not be displayed in user terminals 10 of other users who participate in the chat room.

As shown in FIG. 4E, the search emoticon 200 may further include a search request area 220. When the user selects at least one keyword 211 and selects the search request area 220, a search request including the keyword 211 selected by the user is transmitted. In other words, when the user selects the keyword 211 of 'good cinematic quality' in the story search emoticon 200 that searches movies as a search target, and selects the search request area 220, a search request for a 'movie' with a 'story' of 'good cinematic quality' is transmitted.

Transmitting the search request may be performed, in addition to the user who has transmitted the search emoticon 200 to the chat area 110, based on a user input provided by another user of the chat room. In other words, a user input of selecting a keyword 211 of a search emoticon 200 displayed in the chat area 110 and selecting a search request area 220 may be performed by the user who has transmitted the search emoticon 200 to the chat area 110, as well as, other users who participate in the chat room.

For example, when a search emoticon 200 is displayed in the chat area 110 as a first user has transmitted the search emoticon 200, a second user may select a keyword 211 of the search emoticon 200 displayed in the chat area 110 and transmit a search request. Alternatively, the user who has transmitted the search emoticon 200 to the chat area 110 may only select the keyword 211 and the search request area 220.

When the search emoticon 200 is transmitted as a search request, the search emoticon 200 may be deactivated so that a search request for the same is not performed. Alternatively, it is possible to allow each user who participates in the chat room to provide a user input for one time. In the result emoticon 300, the user's name may be displayed together to show which user has transmitted the search request.

Figure 4F:
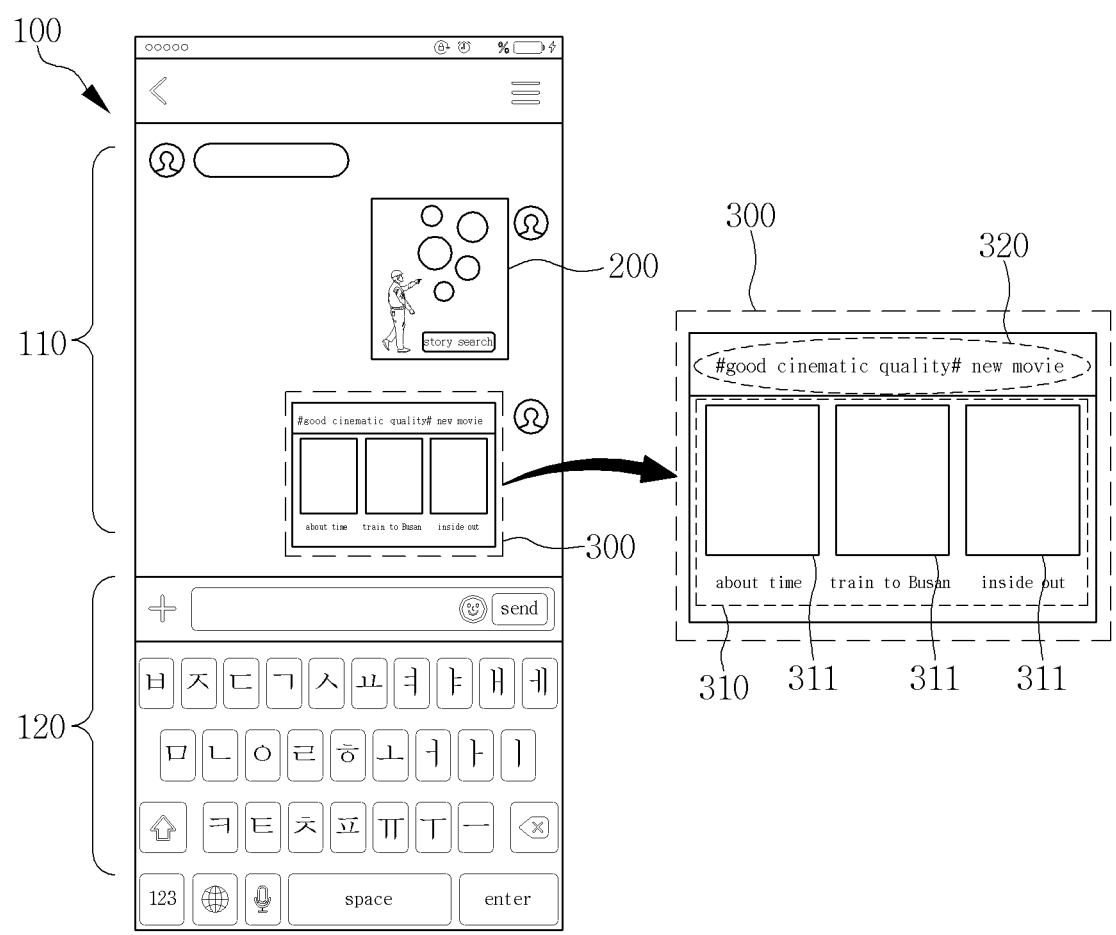

When the user transmits the search request by selecting the search emoticon 200, as shown in FIG. 4F, in step S150, a result emoticon 300 including a search result 311 according to the search request is displayed in the chat area 110. The search request may be transmitted to the search server 30 through the chat server 20, or may be directly transmitted to the search server 30 without passing the chat server 20. The search server 30 performs a search service based on contents of the received search request, and replies the search result 311.

The result emoticon 300 includes a result area 310 including search results 311. For example, as a search result 311 of a search request for a 'movie' with a 'story' of 'good cinematic quality', moves of 'about time', 'train to Busan', 'inside out' are displayed in the result area 310. The result emoticon 300 is displayed in the chat area 110, thus the result emoticon 300 may be displayed in user terminals 10 of all users who participate in the chat room. A display form of the search result 311 displayed in the result area 310 is not limited to the present example and may vary.

The result emoticon 300 may further include a keyword area 320. The keyword area 320 is an area of displaying contents of the search request. The contents of the search request may include a search target, a property, and a keyword 211. For example, when the contents of the search request is a 'new' 'movie' with a 'story' of 'good cinematic quality', "#good cinematic quality #new movie" may be displayed in the keyword area 320 of the result emoticon 300. The user may see the contents of the search request displayed in the keyword area 320, and recognizes by what criteria the search result 311 has been obtained. A form of displaying the contents of the search request on the keyword area 320 may vary.

Figure 4G:
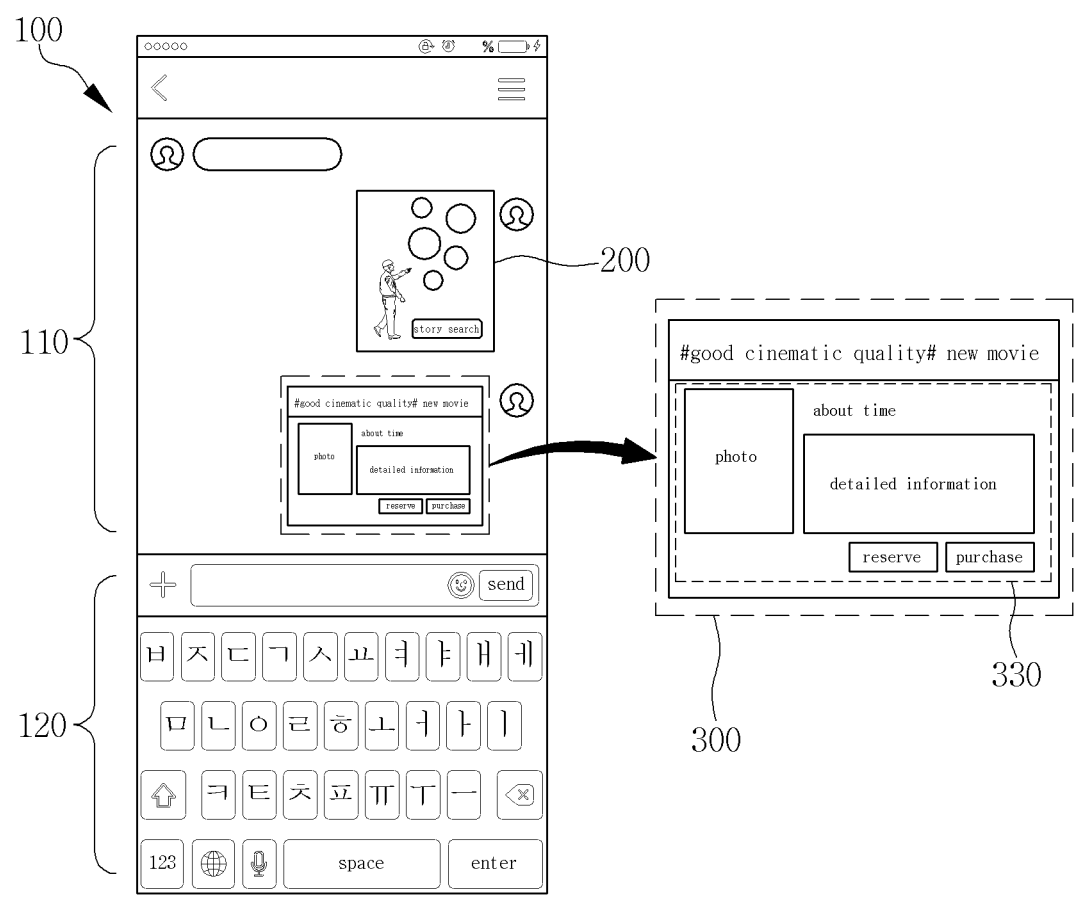

Then, when the user selects the search result 311 displayed in the result emoticon 300, as shown in FIG. 4G, detailed information of the selected search result 311 is displayed.

When the user selects the search result 311 included in the result emoticon 300, in step S150, detailed information of the selected search result 311 is displayed in the chat window 100. As shown in FIG. 4G, an information area 330 for the search result 311 may include detailed information of the search result 311, and may be displayed in a result area of the result emoticon 300 by overlapping thereon. Alternatively, the information area 330 for the search result 311 may be displayed in the entire of the chat window 100 by overlapping thereon.

The information area 330 for the search result 311 may be displayed in various forms according to a type of a search target, contents of the search result 311, etc. The information area 330 may include an icon providing various functions such as reservation, purchase, share, etc. For example, when the user selects an 'about time' from search results 311, the information area 330 may include a reservation icon, a VOD purchase icon, etc. for the movie of 'about time'. The information area 330 may include an advertisement related to the search result 311.

The information area 330 displayed in the chat window 100 may include a 'close' icon, so that when the user selects the close icon, the chat window 100 returns to a state before displaying the information area 330.

Figure 5:
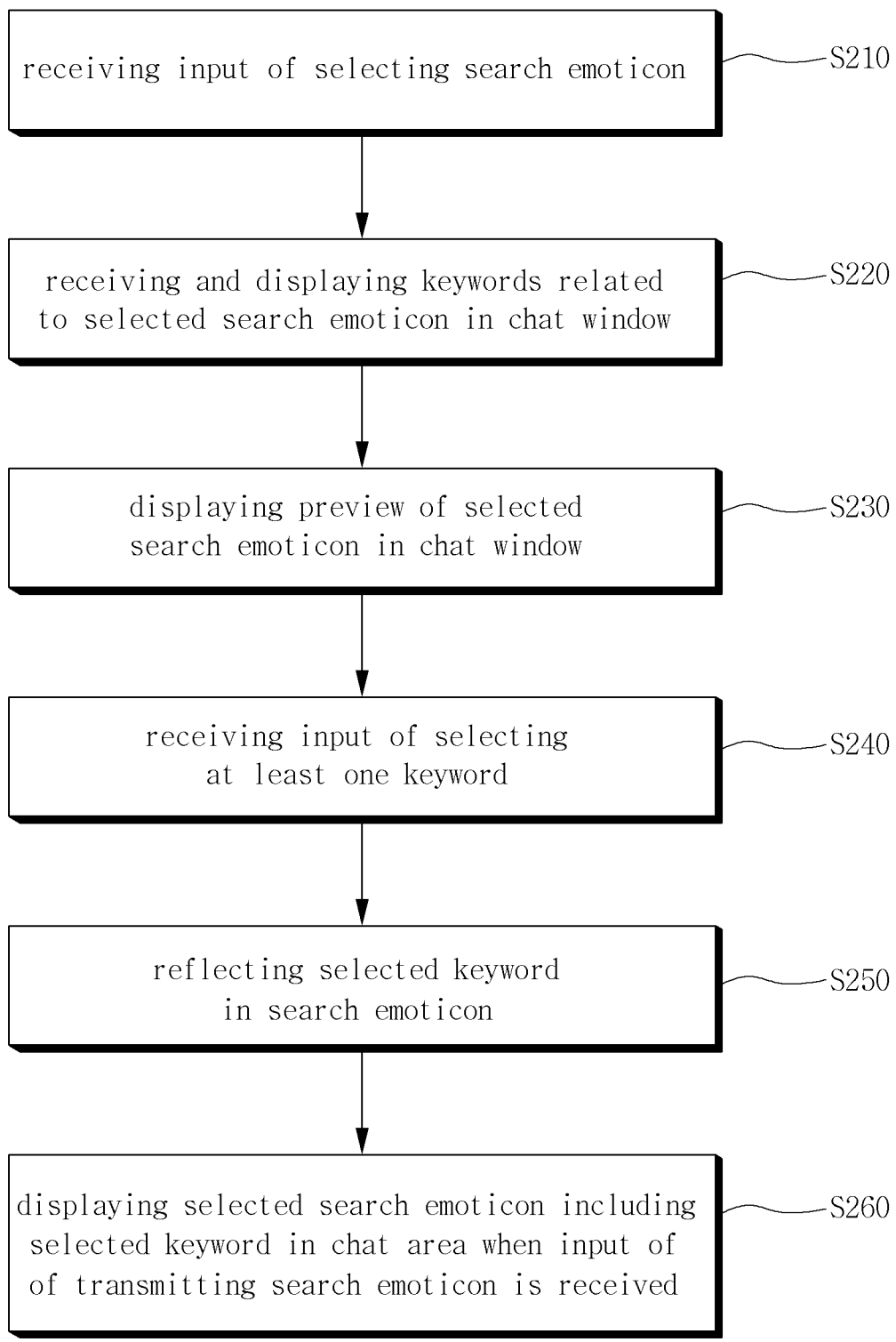
FIG. 5 is a view showing a partial flowchart of a method of operating the user terminal according to an embodiment of the present description.

FIG. 5 is a view showing a partial flowchart of the method of operating the user terminal 10 according to an embodiment of the present description, and FIGS. 6A to 6D are views showing each step of the partial flowchart of the method of operating the user terminal 10 according to an embodiment of the present description.

FIGS. 5, 6A to 6D show another example of step S120 of displaying one search emoticon 200 in the chat area 110 which is selected by the user from search emoticons 200 displayed in the chat window 100.

As shown in FIG. 5, a method of operating the user terminal 10 providing a search service using an emoticon according to an embodiment of the present description may include: step S210 of receiving an input of selecting one of search emoticons 200 displayed in the chat window 100; step S220 of receiving keywords 211 related to the selected search emoticon 200 and displaying the received keywords 211 in the chat window 100; step S240 of receiving an input of selecting at least one of the keywords 211 displayed in the chat window 100; and step S260 of displaying the selected search emoticon 200 including the selected keywords 211 in the chat area 110 when an input of transmitting the selected search emoticon 200 is received.

In addition, the method of operating the user terminal 10 providing the search service using the emoticon according to an embodiment of the present description may further include: step S230 of displaying a preview 240 of the selected search emoticon 200 when an input of selecting at least one of the search emoticons 200 is received; and step S250 of displaying the selected keyword 211 on the preview 240 when an input of selecting at least one of the keyword 211 is received.

Figure 6A:
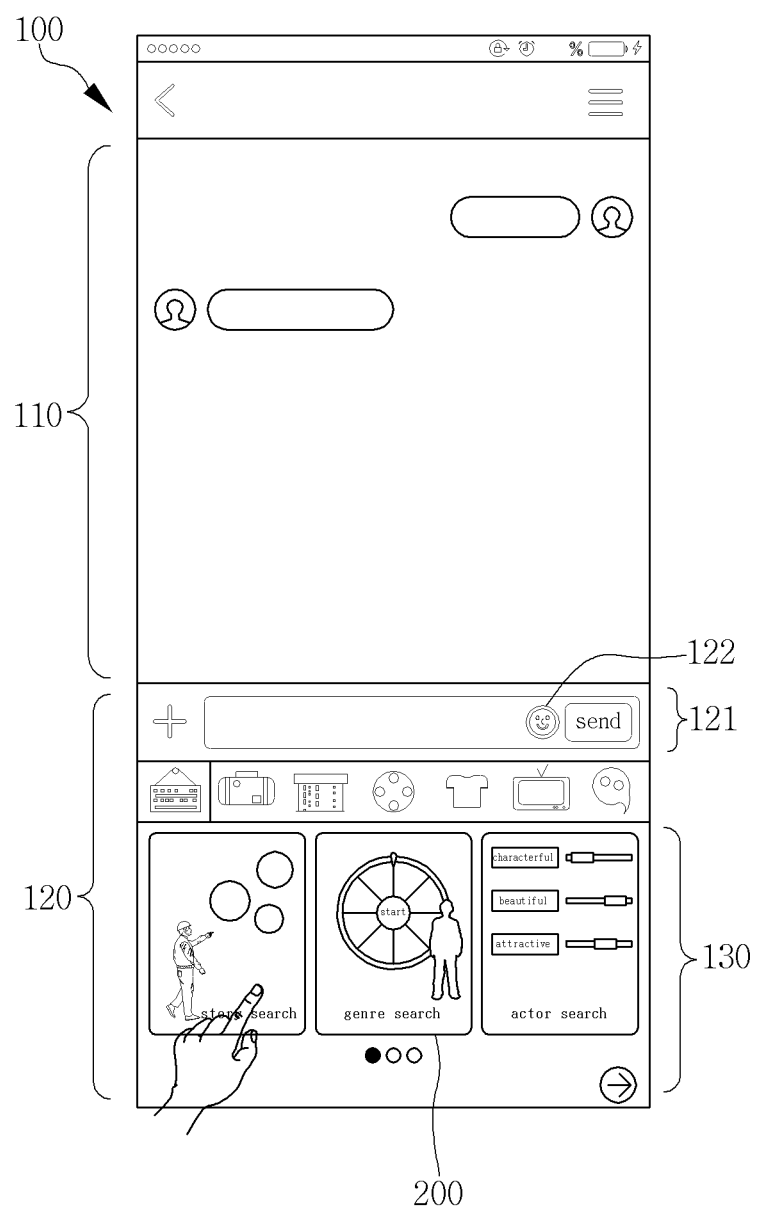
FIGS. 6A to 6D are views showing each step of the partial flowchart of the method of operating the user terminal according to an embodiment of the present description.

As shown in FIG. 6A, when the user selects an search emoticon listing icon 122 in the chat window 100, step of displaying a plurality of search emoticons 200 which provides a search service based on a property of a search target (step S110 of FIG. 3) is performed. Then, in step S210, when the user selects one of search emoticons 200 displayed in the chat window 100, the user terminal 10, by the input unit 15, receives an input of selecting one of search emoticons 200 displayed in the chat window 100, the control unit 13 provides information related to the selected search emoticon 200 (search target, property) to the communication unit 11, and transmits a signal requesting for a keyword 211 related to the selected search emoticon 200 to the search server 30.

When the search server 30 receives a signal requesting for a keyword 211 from the user terminal 10, the search server 30 transmits keywords 211 related to the search emoticon 200 selected from the search emoticons 200 displayed in the chat window 100. Herein, according to a search target and a property of the search emoticon 200 selected by the user, keywords 211 provided by the search server 30 may vary. Since a database (preference information DB 31) related to keywords 211 and which is included in the search server 30 is updated in real-time, keywords 211 provided by the search server 30 may vary even when the same search emoticon 200 is selected but at another time. Generating a keyword list by the search server 30 will be described later in detail.

Figure 6B:
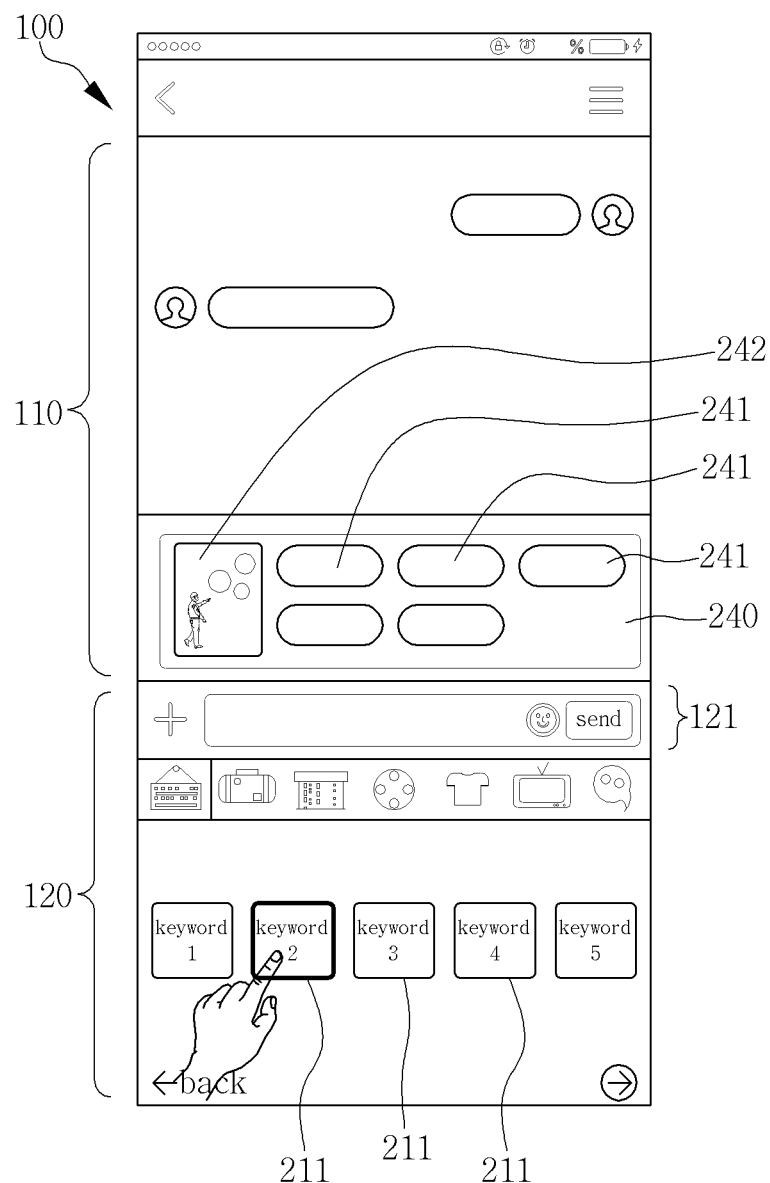

Then, as shown in FIG. 6B, in step S220, the user terminal 10 may receive keywords 211 related to the selected search emoticon 200 and display the received keywords 211 in the chat window 100. A number of the keywords 211 displayed in the chat window 100 is larger than a maximum number of keywords 211 that may be included in the search emoticon 200. The keywords 211 may be displayed in the input area 120 of the chat window 100, may be displayed in a search emoticon list 130 of FIG. 6A by overlapping thereon. A method of displaying at least a part of the keywords 211 and displaying the remaining keywords 211 by inputting a scroll input or a sweep touch to one direction from the user may be used.

In addition, as shown in FIG. 6B, with step S220, when the user terminal 10 receives an input of selecting one of search emoticons 200, step S230 of displaying the preview 240 of the selected search emoticon in the chat window 100 may be performed. The preview 240 of the search emoticon 200 may include at least one of a thumbnail image 242 of the search emoticon 200, a keyword area 241 displaying the keyword 211 selected by the user, and a description of how to use the search emoticon 200. The preview 240 of the search emoticon 200 may be displayed by overlapping on a part of the chat area 110 of the chat window 100.

Figure 6C:
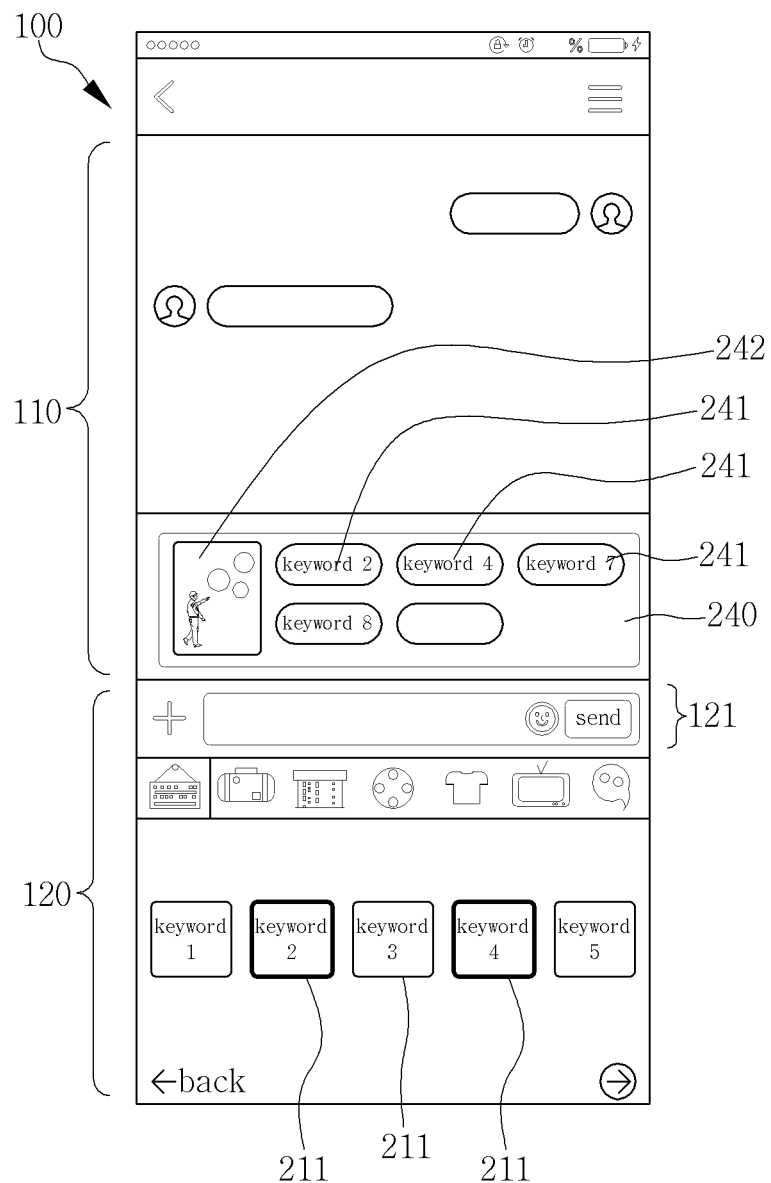

Then, as shown in FIG. 6C, when the user selects at least one of keywords 211 displayed in the input area 120 of the chat window 100, in step S240, the user terminal 10 receives, through the input unit 15, an input of selecting at least one of keywords 211 displayed in the chat window 100, and activates and displays the selected keyword 211 through the display unit 14.

When an input of selecting at least one of keywords 211 displayed in the chat window 100 is received, step S250 of displaying the selected keyword 211 in the preview 240 may be performed while activating the selected keyword 211. The preview 240 of the search emoticon 200 may include a number of the keyword areas 241 which is defined by the search emoticon 200, and displays the keyword 211 selected by the user in the keyword area 241, the keyword 211 is reflected in the preview 240.

For example, when the search emoticon 200 is capable of displaying five keywords 211 in the suggestion area 210, the preview 240 of the search emoticon 200 may include five keyword areas 241. When the user selects one keyword 211, the selected keyword 211 may be activated, and may be displayed in one of the five keyword areas 241 of the preview 240 of the search emoticon 200.

Figure 6D:
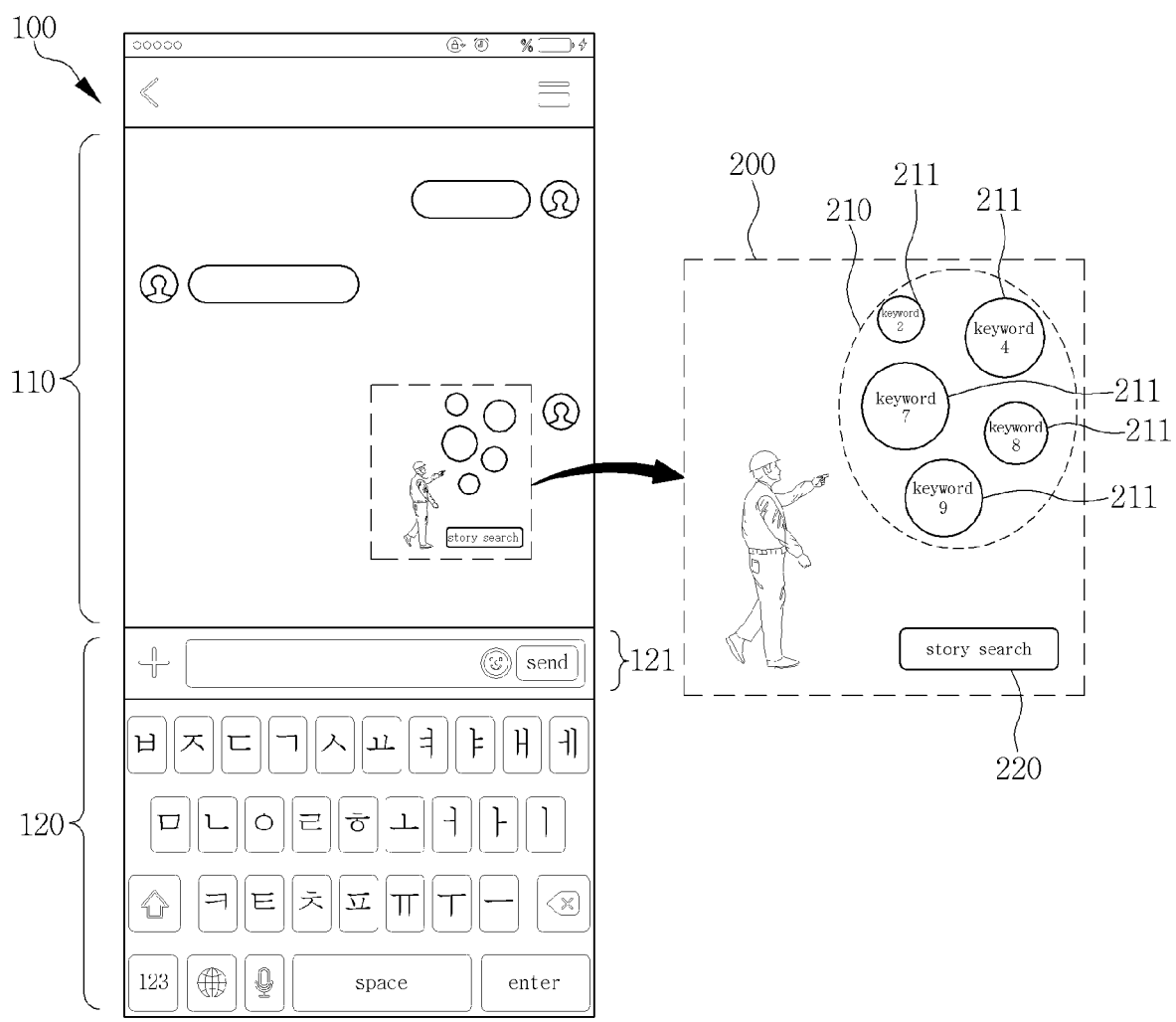

Then, as shown in FIG. 6D, when the user selects an icon of transmitting the search emoticon 200, the user terminal 10 receives an input for transmitting the selected search emoticon 200 through the input unit 15. The user terminal 10 may display the search emoticon 200 including the keywords 211 selected by the user in the chat area 110, and transmit the search emoticon 200 including the selected keywords 211 to the chat server 20 or the search server 30 through the communication unit 11.

By performing the above steps, the user may directly select keywords 211 to be included in the search emoticon 200 from a plurality of keywords 211 provided from the search server 30, and the user customized search emoticon 200 including keywords 211 selected by the user may be generated.

FIGS. 7A to 7C are views showing an embodiment of the search emoticon 200 according to an embodiment of the present description. The search emoticon 200 may include a character, an advertisement, etc.

FIG. 7A shows a keyword suggesting search emoticon 200 displaying at least one keyword 211 on the suggestion area 210, and enabling the user to select at least one keyword 211 and to select the search request area 220. A number of keywords 21 or an arrangement thereof which is displayed in the suggestion area 210 may vary. The search emoticon 200 or the result emoticon 300 may further include an affiliated service area 230. The affiliated service area 230 may display an advertisement, a character of the affiliated company, an image representing feelings, etc.

The search emoticon 200 may include a storage area 250 or a share area 260. When the user wants to store the search emoticon 200 to use again later, by selecting the storage area 250 of the search emoticon 200, the search emoticon 200 may be stored through the search server 30. The storage area 250 may be represented in another term such as 'store', 'bookmark', 'favorite', etc. When the user wants to share the search emoticon 200 among another users or another chat room, by selecting the share area 260 of the search emoticon 200, the search emoticon 200 may be transferred to another chat room or another user. The share area 260 may be represented in a term of 'share', 'transfer', etc.

FIG. 7B shows a random type search emoticon 200 displaying a rotary board displaying a plurality of keywords 211 on the suggestion area 210, and enabling the user to randomly select the keyword 211 after elapsing a predetermined time when the user select the rotary board, and to select the search request area 220. In the suggestion area 210, in addition to the rotary board, a roulette method, and a lottery method showing a hidden keyword 211 by scratching the suggestion area 210 by the user may be used.

FIG. 7C shows a weight type search emoticon 200 displaying at least one keyword 211 with an area 212 for selecting a weight thereof in the suggestion area 210, and enabling the user to select the weight of the keyword 211, and to select the search request area 220. In the keyword 211, words included in a keyword list received from the search server 30 may be arranged, another words included in the keyword list may be added when a keyword 211 which the user wants to remove is removed therefrom. The weight may be input by the user by using a keypad, or may be input by moving a point displayed in a bar having a range of 0~100%.

The above search emoticon 200 may be classified into a type of disabling a user to select keyword 211 to be included in a suggestion area 210, and a type of enabling a user to generate a user customized search emoticon 200 by selecting a keyword 211 to be included in the suggestion area 210.

Figure 8:
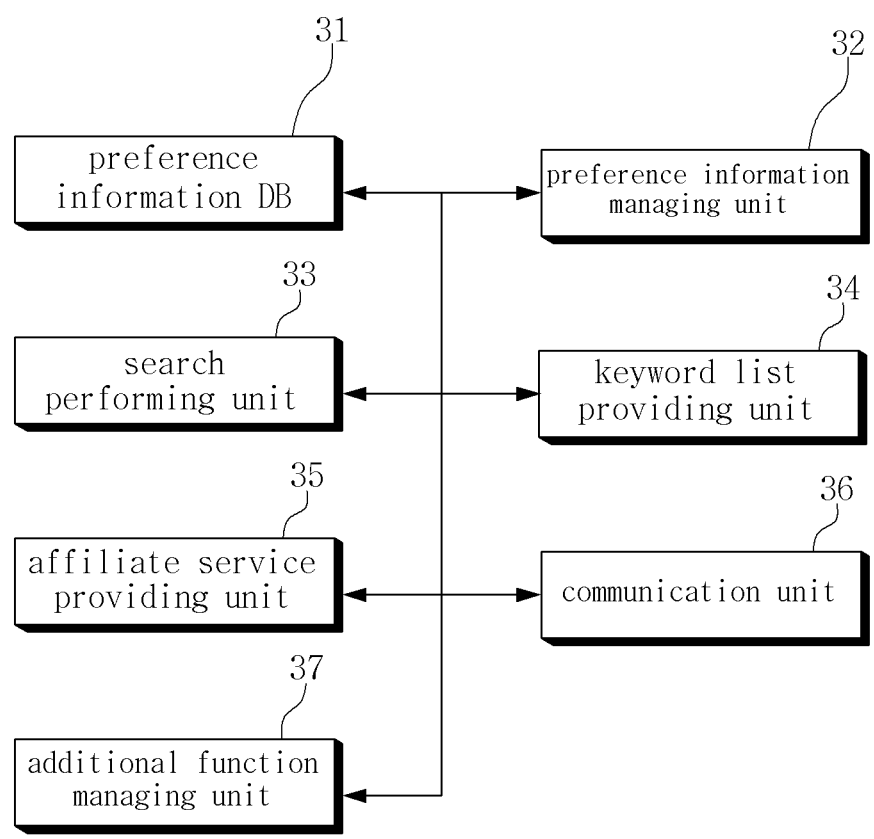
FIG. 8 is a view showing a block configuration of a search server according to an embodiment of the present description.
Figure 9:
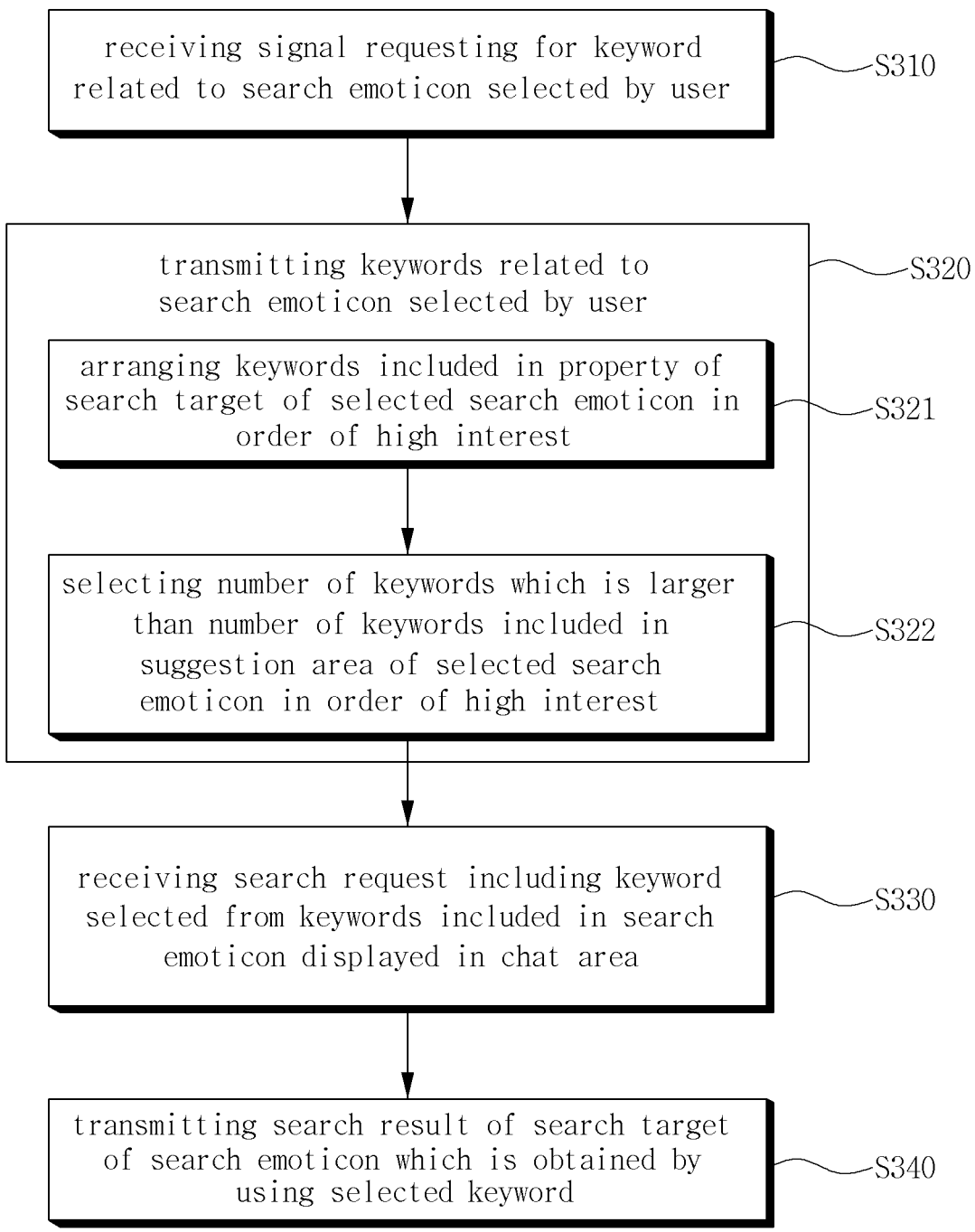
FIG. 9 is a view showing a flowchart of a method of operating the search server according to an embodiment of the present description.

FIG. 8 is a view showing a block configuration of the search server 30 according to an embodiment of the present description, and FIG. 9 is a view showing a method of operating the search server 30 according to an embodiment of the present description.

As shown in FIG. 8, the search server 30 may include a preference information database (DB) 31, a preference information managing unit 32, a search performing unit 33, a communication unit 36, a keyword list providing unit 34, an affiliate service providing unit 35, and an additional function managing unit 37. The search server 30 autonomously includes information of a search target, and when a search target is received, the search server 30 performs searching according to the search request and transmits a search result 311.

The communication unit 36 provides an interface enabling communication between the search server 30 and the chat server 20 or at least one user terminal 10 transmitting a search request according to a method of providing a search service using an emoticon. The communication unit 36 may provide an application programming interface (API) capable of transmitting and receiving a search request and a search result 311.

The preference information DB 31 stores preference information related to a property of a search target and which includes words (or expressions) representing a preference of users exposed on the Internet, and a number of collected times of the word and a time thereof.

As a search target, various objects such as movies, stars, wines, web-toons, etc. are present. Search targets include own properties. For example, movies may include properties of a story, a manufacture country, actors, etc. and stars may include properties of character, charm, images, etc. Various words (or expressions) reflecting the preference of people for the property of the search target are stored. For example, for a story of a movie, people may express his or her feelings of the movie by using words representing preference such as novel, sad, twist story, philosophical, etc.

Preference information is obtained by collecting words representing a preference from subjective opinions of people for a search target which are posted in the Internet such as homepage, blog, SNS, twitter, etc., and the preference information is data including a time when the word representing the preference is collected, and a number of collected times. Words included in a property of a search target may be stored in association with a time when the word is collected, a number of collected times, a source where the words is collected, and information of the writer. All kinds of the above information may be digitized for each word.

The preference information managing unit 32 collects words representing preferences of people for various properties of a search target from information posted in the Internet, generates preference information including times when a word is collected and number of collected times, and continuously updates on the preference information DB 31. 'Information posted in the Internet' includes information posted in the Internet such as homepage, blog, internet café, SNS, mass media such as newspaper and magazines posted in the Internet, portal site, etc.

The keyword list providing unit 34 generates a keyword list including words with high interest by people among words for a property of a search target, and transmits the keyword list to the user terminal 10. Words, included in the keyword list may be represented as a keyword 211 in the suggestion area 210 of the search emoticon 200.

When extracting words to be included in the keyword list, interest is evaluated for words to be included in each property of a search target. For example, for a property of story of a 'movie' as a search target, rather than considering whether to evaluate a story of a movie, words (sad, new, etc.) for the story property may be included in the keyword list in the order of the highest interest.

Interest by people may be determined to be high when a number of collected times is larger based on a number of collected times in a predetermined period, and the interest may be adjusted with reference to real-time information on anniversary such as Christmas and public holidays and natural phenomena such as snow, rain, typhoon, etc. The interest may be calculated by adding a weight according to a time when a word is collected such as assigning a high score to words that are recently collected, and assigning a low score to words that are collected long time ago.

The search performing unit 33 searches preference information DB 31 for search targets that is identical to a keyword 211 included in a contents of the search request and matches to a preference when a search request is received, and provides the result to the user terminal 10 as a search result 311. For example, the search performing unit 33 the preference information DB 31 for a keyword 211 selected by a user for one property of a specific search target, and transmits search targets including identical words to the keyword 211 as a search result 311. The search result 311 is displayed in a result area 310 of the result emoticon 300. When transmitting the search result 311, detailed information of each search result 311 may be transmitted together, and the detailed information may be displayed in the information area 330 displayed when the user selects the search result 311 of the search emoticon 200.

The affiliate service providing unit 35 may provide advertisement information displayed in an advertisement area that may be included in the search emoticon 200 or the result emoticon 300, or may control a connection to a service page of the affiliated company when an icon of purchase, reservation, etc which is displayed in the search emoticon 200 or on a result infoticon is selected. For example, when the search emoticon 200 is transmitted to the chat area 110, the affiliate service providing unit 35 may provide advertisement information in real time so that different advertisements may be displayed whenever the search emoticon 200 is transmitted, or may store a number of times of displaying the advertisement. Alternatively, when the user selects a purchase or reservation emoticon in the search emoticon 200 or the result emoticon 300, when an in-app purchase is available, the corresponding service may be provided, and a purchase or reservation service page of the affiliated company may be connected.

The additional function managing unit 37 provides an additional function such as storing or sharing the search emoticon 200. When the search server 30 receives a request of storing the search emoticon 200 from the user terminal 10, the additional function managing unit 37 stores the search emoticon 200 received from the user terminal 10 in association with a user ID or account of the user using the user terminal 10. In addition, when the search server 30 receives a request of sharing the search emoticon 200 from the user terminal 10, the additional function managing unit 37 transmits the search emoticon 200 received from the user terminal 10 to another user or another chat room.

Herein, the search emoticon 200 to be stored and shared, as shown in FIG. 4D, may include a keyword 211 in which keyword 211 provided by the search server 30 are automatically reflected. Alternatively, the search emoticon 200 to be stored and shared, as shown in FIGS. 6C and 6D, may be a search emoticon 200 generated by the user and which includes keywords 211 selected by the user from keywords 211 provided by the search server 30.

As shown in FIG. 9, a method of operating the search server 30 providing a search service using an emoticon according to an embodiment of the present description may include: step 320 of transmitting keywords 211 related to a selected search emoticon 200 among search emoticons 200 displayed in the chat window 100; step S330 of receiving a search request including the selected keyword 211 among the keywords 211 included in the search emoticon 200 displayed in the chat area 110; and step S340 of transmitting a search result obtained by searching a search target of the search emoticon 200 displayed in the area 110 by using the selected keyword 211.

In addition, step S320 may include: step S321 of arranging words included in a property of the search target of the selected search emoticon 200 among the search emoticons 200 displayed in the chat window 100 in order of the high interest by people; and step S322 of selecting a number of words to be included in the suggestion area of the search emoticon 200 as a keyword 211 in an order of high interest by people, and transmitting the same.

First, when the user selects one of search emoticons 200 displayed in the chat window and select a 'send' icon, or the user selects one of the search emoticons 200 through which the user may select a keyword 211, the user terminal 10 transmits a signal requesting a keyword 211 related to the selected search emoticon 200.

When the search server 30 receives a signal requesting for a keyword 211 related to the selected search emoticon 200 through the communication unit 36 in step S310, in step S321, the keyword list providing unit 34 arranges words included in a property of a search target of the selected search emoticon 200 in an order of interest. Words stored in the preference information DB 31 are updated in real time by the preference information managing unit 32, so that whenever the keyword list is generated, ranking of the keywords 211 may vary.

In step S322, the keyword list providing unit 34 selects a number of words which is larger than a predetermined number in an order of high interest. In case of a search emoticon 200 for which the user is not possible to select a keyword 211 to be included thereto, a keyword list is generated by selecting a number of words corresponding to a number of keywords 211 displayed in the suggestion area of the search emoticon 200. For example, when five keywords 211 are included in the search emoticon 200, five words may be selected as keywords 211.

In case of a search emoticon 200 for which the user may select a keyword 211 to be included thereto, a keyword list may be generated by selecting number of words which is larger than a number of keywords 211 displayed in the suggestion area of the search emoticon 200. For example, when five keywords 211 are included in the search emoticon 200, fifteen words may be selected as keywords 211. The keyword list providing unit 34 may transmits words selected as described above as keywords 211 related to the search emoticon 200 selected by the user.

Then, when the user selects at least one of keywords 211 included in the search emoticon 200 displayed in the chat area 110 and selects a search request area 220, the user terminal 10 may transmit a search request including the keyword 211 selected among the keywords 211 included in the search emoticon 200 displayed in the chat area 110.

In step S330, when the search server 30 receives a search request including the keyword 211 selected among the keywords 211 included in the search emoticon 200 displayed in the chat area 110, in step S340, the search performing unit 33 transmits a search result 311 obtained by searching for a search target of the search emoticon 200 by using the keyword 211 included in a contents of the search request.

According to an embodiment of the present description described above, a search service may be provided in a chat window 100 by using an emoticon included in a chat application provided from a chat service, rather than requiring a user to exit the chat application, thus a convenient search environment of directly providing a search service may be provided to the user without executing an additional web browser for the same.

In addition, when the user selects a search result 311, in order to display information of the search result 311, detailed information of the selected search result 311 may be displayed in the chat window 100 by overlapping thereon rather than executing a web browser by going out the chat application, thus the user may be conveniently provided with the search result 311.

In addition, the search emoticon 200 provides the user keywords 211 in which a preference of a property of the search target is reflected, and the user request a search by selecting a keyword 211 matching to his or her preference, thus the user may be provided with a search result 311 that matches to his or her preference.

In addition, by providing detailed information of the search result 311, an advertisement or an affiliate service such as purchase service and reservation service may be provided together, thus a convenient e-commerce environment from searching to purchasing may be provided.

Figure 10:
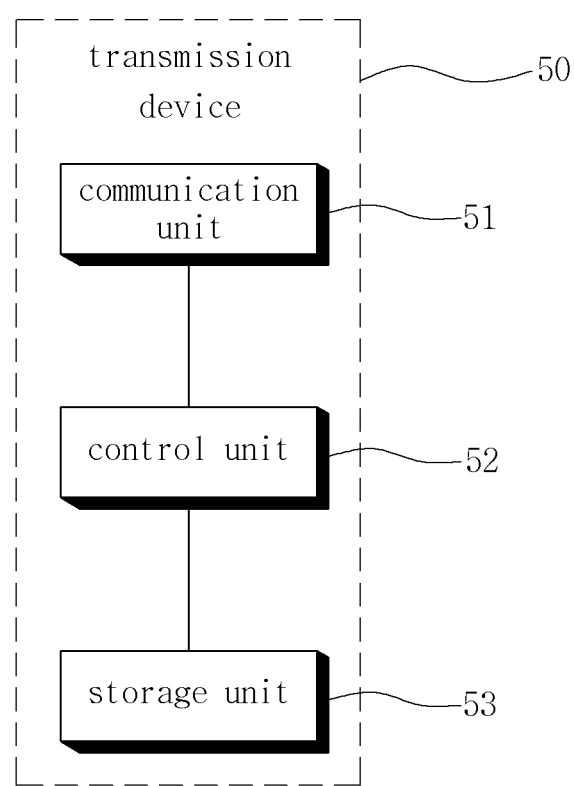
FIG. 10 is a view showing a block configuration of a transmission device according to an embodiment of the present description.

FIG. 10 is a view showing a block configuration of a transmission device 50 according to an embodiment of the present description.

The transmission device 50 may include a communication unit 51, a control unit 52, and a storage unit 53. The storage unit 53 stores a program (infoticon module) or an installation package (installation program) for installing the program or both for performing steps of a part of embodiments described with reference to FIGS. 1 to 9. Hereinafter, the "program (infoticon module) or an installation package (installation program) for installing the program or both for performing steps of a part of embodiments described with reference to FIGS. 1 to 9" is called an infoticon program.

A developer using a system of the transmission device 50 or a manager of the transmission device 50 may store the infoticon program in the storage unit 53. When a request message that request the infoticon program is received through the communication unit 51, the control unit 52 transmits the infoticon program to a user terminal 10 that has been transmitted the request message through the communication unit 51.

Figure 11:
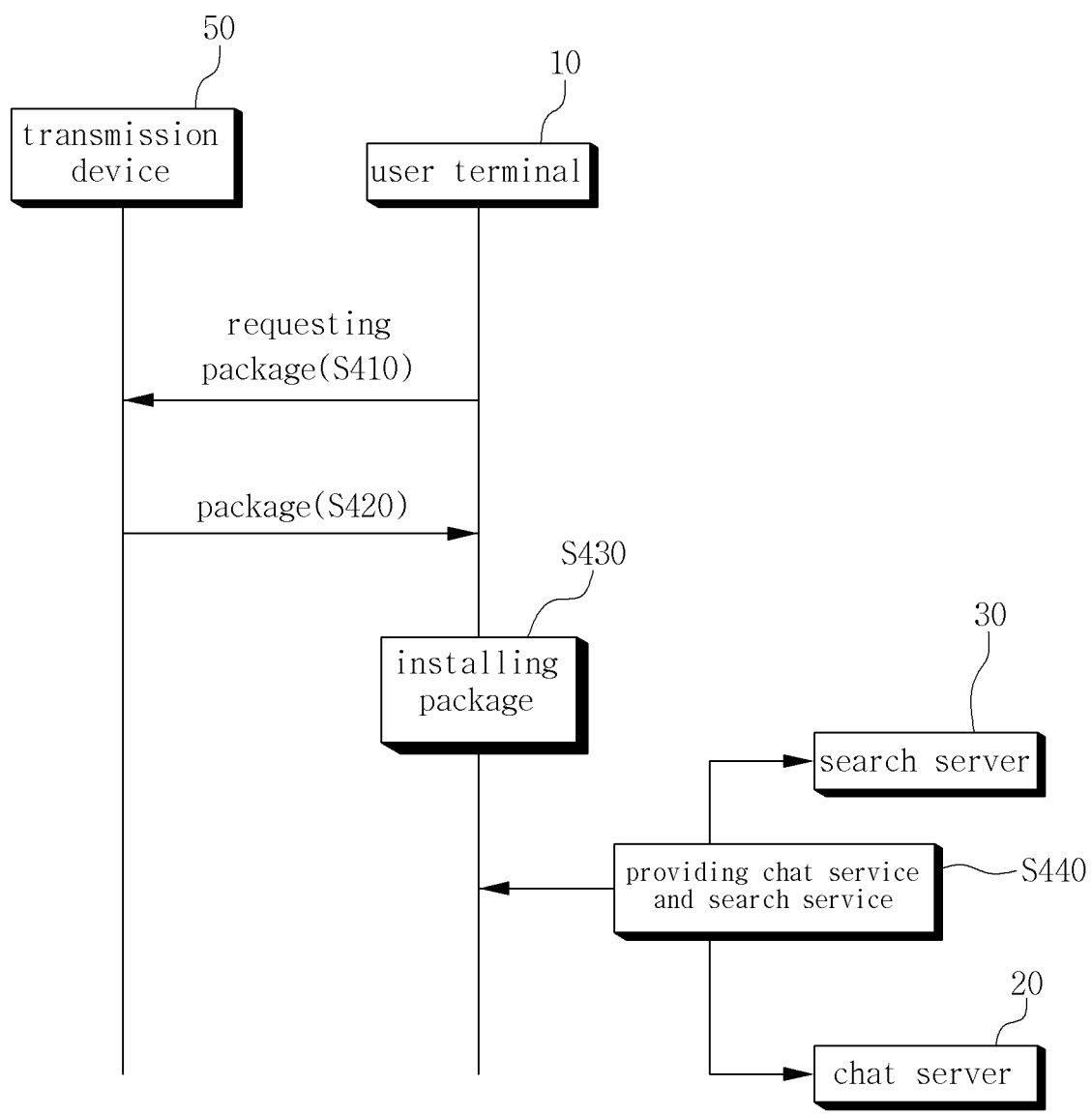
FIG. 11 is a view showing a flowchart of installing a search service program using an emoticon according to an embodiment of the present description.

FIG. 11 is a view showing a flowchart of installing a search service program using an emoticon according to an embodiment of the present description.

First, in step S410, the user terminal 10 transmits a package request message to the transmission device 50. The package request message is a message requesting the infoticon program. The transmission device 50 transfers the infoticon program (package) to the user terminal 10.

In step S430, the user terminal 10 installs the received infoticon program (package). When the installation is unnecessary and the received infoticon program is executable as it is, step S430 may be omitted. In step S440, the user terminal 10 execute the infoticon programs according to a user input, and performs steps of a part of embodiments described with reference to FIGS. 1 to 9 by being connected to the search server 30 or the chat server 20 or both.

Although a preferred embodiment of the present invention has been described for illustrative purposes, those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims

What is claimed is:

1. A method of operating a user terminal providing a search service using an emoticon, the method comprising:
    displaying in a chat area one search emoticon selected by a user from search emoticons displayed in a chat window,
        wherein the displaying in the chat area of one search emoticon selected by the user among the search emoticons displayed in the chat window includes:
        receiving an input of selecting one of the search emoticons providing a search service based on a property a search target, displayed in the chat window;
        receiving and displaying keywords reflecting a preference of the search target, related to the selected search emoticon in the chat window;
        receiving an input of selecting at least one of the keywords displayed in the chat window; and
        displaying the selected search emoticon including the selected keyword in the chat area when an input of transmitting the selected search emoticon is received;
    transmitting a search request by receiving a user input for the search emoticon displayed in the chat area; and
    displaying a result emoticon including a search result according to the search request in the chat area;
    wherein the chat area is an area that is commonly displayed in the user terminal of all users who participate in a chat room,
    wherein the user input for the search emoticon displayed in the chat area is performed by one of all users who participate in the chat room
    wherein for the user input for the search emoticon displayed in the chat area, the one of all users who participate in the chat room selects at least one keyword displayed in a suggestion area of the search emoticon, or selects random search displayed in the suggestion area and selects a search request area of the search emoticon.

2. The method of claim 1, further comprising: when the user selects the search result included in the result emoticon, displaying detailed information of the selected search result in the chat window.

3. The method of claim 1, wherein the search emoticon is provided such that the user is capable of selecting at least one keyword reflecting a preference of a property of a search target.

4. The method of claim 1, further comprising: before the transmitting of the search emoticon to the chat window, when the user selects a search emoticon listing icon in the chat window, displaying a plurality of search emoticons in the chat window, the search emoticons providing a search service based on a property of a search target.

5. The method of claim 1, wherein the transmitting of the search request is performed, in addition to the user who has transmitted the search emoticon to the chat area, based on a user input provided by another user who participates in a chat room.

6. The method of claim 1, wherein the displaying in the chat area of one search emoticon selected by the user from the search emoticons displayed in the chat window includes:
    selecting, by the user, the search emoticon and selecting a 'send' icon;
    receiving, by user terminal, a keyword list from a search server;
    arranging, by the user terminal, words included in the keyword list as a keyword in a suggestion area of the selected search emoticon; and
    displaying, by the user terminal, the search emoticon in which the keyword list is reflected in the chat area.

7. The method of claim 1, further comprising: when the input of selecting one of the search emoticons is received, displaying a preview of the selected search emoticon in the chat window; and
    when the input of selecting at least one of the keyword is received, displaying the selected keyword in the preview.

8. The method of claim 1, wherein the search emoticon includes a storage area or a share area, when an input of selecting the storage area or the share area is received, the search emoticon and the keyword which are displayed in the chat area are stored in a search server or are shared through the search server.

9. A user terminal providing a search service using an emoticon, the user terminal comprising:
    a display unit displaying a chat window including a search emoticon providing a search service based on a property a search target;
    an input unit for receiving an input of selecting an object in the chat window;

a control unit displaying keywords reflecting a preference of the search target, related to a search emoticon selected in the chat window when the input unit receives an input of selecting the search emoticon, and generating a signal of displaying the selected search emoticon including the selected keywords in a chat area when the input unit receives an input of selecting of at least one of the keywords and an input of transmitting the selected search emoticon; and a communication unit receiving keywords reflecting a preference of the search target, related to the selected search emoticon, and transmitting a search emoticon including selected keywords;

wherein the chat area is an area that is commonly displayed in the user terminal of all users who participate in a chat room, wherein the user input for the search emoticon displayed in the chat area is performed by one of all users who participate in the chat room wherein for the user input for the search emoticon displayed in the chat area, the one of all users who participate in the chat room selects at least one keyword displayed in a suggestion area of the search emoticon, or selects random search displayed in the suggestion area and selects a search request area of the search emoticon.

10. A method of operating a search server providing a search service using an emoticon, the method comprising:

transmitting keywords related to a search emoticon selected from search emoticons displayed in a chat window, wherein the search emoticons provide a search service based on a property a search target, and the keywords reflect a preference of the search target;

receiving a search request including a keyword selected from the keywords included in the search emoticon displayed in a chat area; and transmitting a search result obtained by searching for a search target of the search emoticon displayed in the chat area by using the selected keyword;

wherein the chat area is an area that is commonly displayed in the user terminal of all users who participate in a chat room, wherein the search request is performed by one of all users who participate in the chat room, wherein for the search request, the one of all users who participate in the chat room selects at least one keyword displayed in a suggestion area of the search emoticon, or selects random search displayed in the suggestion area and selects a search request area of the search emoticon.

11. The method of 10, wherein the transmitting of the keywords related to the search emoticon selected from the search emoticons displayed in the chat window includes:

arranging words included in a property of a search target of the search emoticon selected from the search emoticons displayed in the chat window in an order of high interest by people; and selecting a number of keywords which is larger than a number of keywords included in a suggestion area of the search emoticon in an order of high interest by people from the arranged words, and transmitting the selected keywords.

12. The method of claim 10, further comprising:

receiving a request for storing the search emoticon displayed in the chat area; and storing the search emoticon displayed in the chat area and the keywords included in the search emoticon displayed in the chat area in association with a user account.

13. A search server providing a search service using an emoticon, the search server comprising:

a communication unit performing communication with at least one user terminal using a search service using an emoticon;

a keyword list providing unit selecting and transmitting keywords related to a search emoticon selected from search emoticons displayed in a chat window, wherein the search emoticons provide a search service based on a property a search target, and the keywords reflect a preference of the search target; and a search performing unit providing a search result obtained by searching for a search target of the search emoticon displayed in the chat area by using a keyword selected from the keywords included in the search emoticon displayed in the chat area;

wherein the chat area is an area that is commonly displayed in the user terminal of all users who participate in a chat room, wherein a user input for selecting the keyword from the keywords included in the search emoticon displayed in the chat area is performed by one of all users who participate in the chat room, wherein for the user input for selecting the keyword from the keywords included in the search emoticon displayed in the chat area, the one of all users who participate in the chat room selects at least one keyword displayed in a suggestion area of the search emoticon, or selects random search displayed in the suggestion area and selects a search request area of the search emoticon.

14. The search server of claim 13, further comprising: an additional function managing unit storing the search emoticon or transmitting the search emoticon to another user or another chat room when a request for storing or sharing the search emoticon is received from the user terminal.

* * * * *